(12) United States Patent
Ohta et al.

(10) Patent No.: US 11,968,731 B2
(45) Date of Patent: Apr. 23, 2024

(54) WIRELESS COMMUNICATION APPARATUS, WIRELESS COMMUNICATION SYSTEM, AND PROCESSING METHOD

(71) Applicant: FUJITSU LIMITED, Kawasaki (JP)

(72) Inventors: Yoshiaki Ohta, Yokohama (JP); Shinichiro Aikawa, Yokohama (JP); Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/025,475

(22) Filed: Jul. 2, 2018

(65) Prior Publication Data

US 2018/0324884 A1  Nov. 8, 2018

Related U.S. Application Data

(63) Continuation of application No. PCT/JP2016/050569, filed on Jan. 8, 2016.

(51) Int. Cl.
*H04W 76/15* (2018.01)
*H04W 36/00* (2009.01)
(Continued)

(52) U.S. Cl.
CPC ........... *H04W 76/15* (2018.02); *H04W 36/03* (2018.08); *H04W 68/005* (2013.01);
(Continued)

(58) Field of Classification Search
CPC ... H04W 76/15; H04W 68/005; H04W 88/08; H04W 88/02; H04W 28/0247;
(Continued)

(56) References Cited

U.S. PATENT DOCUMENTS

2006/0039332 A1* 2/2006 Kotzin ................. H04W 36/14
370/331
2008/0311926 A1  12/2008 Fischer et al.
(Continued)

FOREIGN PATENT DOCUMENTS

JP  2005-151383 A  6/2005
JP  2010-529731 A  8/2010
(Continued)

OTHER PUBLICATIONS

H.-Y. Chen, M.-J. Shih and H.-Y. Wei, "Handover mechanism for device-to-device communication," 2015 IEEE Conference on Standards for Communications and Networking (CSCN), Tokyo, Japan, 2015, pp. 72-77, doi: 10.1109/CSCN.2015.7390423. (Year: 2015).*
(Continued)

*Primary Examiner* — Thinh D Tran
(74) *Attorney, Agent, or Firm* — Myers Wolin, LLC

(57) ABSTRACT

A processing method includes: determining at least one of first conditions in a first situation, by a second wireless apparatus in a system which includes a first wireless apparatus and a plurality of the second wireless apparatuses, the first situation being when the wireless apparatus operates in an idle mode and when communication between the wireless apparatus and the one other second wireless apparatus is performed via a first channel, the first conditions including whether a quality of the first channel is lower than a predetermined quality and whether a switching instruction is received; and executing a first process by the second wireless apparatus when the at least one of first conditions is met, the first process including establishing a second channel between the second wireless apparatus and the first wireless apparatus, and switching from communication via the first channel to communication via the second channel.

14 Claims, 15 Drawing Sheets

(51) Int. Cl.
*H04W 68/00* (2009.01)
*H04W 72/23* (2023.01)
*H04W 76/23* (2018.01)
H04W 28/02 (2009.01)
H04W 36/30 (2009.01)
H04W 40/34 (2009.01)
H04W 88/02 (2009.01)
H04W 88/08 (2009.01)

(52) U.S. Cl.
CPC .......... *H04W 72/23* (2023.01); *H04W 76/23* (2018.02); *H04W 28/0247* (2013.01); *H04W 36/30* (2013.01); *H04W 40/34* (2013.01); *H04W 88/02* (2013.01); *H04W 88/08* (2013.01)

(58) Field of Classification Search
CPC ..... H04W 40/34; H04W 36/30; H04W 36/03; H04W 72/042; H04W 76/23
See application file for complete search history.

(56) References Cited

U.S. PATENT DOCUMENTS

| | | |
|---|---|---|
| 2010/0034163 A1 | 2/2010 | Damnjanovic et al. |
| 2010/0279672 A1 | 11/2010 | Koskela et al. |
| 2011/0176450 A1 | 7/2011 | Kubota |
| 2012/0002643 A1 | 1/2012 | Chung et al. |
| 2012/0163235 A1 | 6/2012 | Ho et al. |
| 2013/0003541 A1* | 1/2013 | Zakrzewski .......... H04W 48/18 370/230 |
| 2013/0223356 A1 | 8/2013 | Khoshnevis et al. |
| 2013/0322413 A1* | 12/2013 | Pelletier ................ H04L 5/0091 370/336 |
| 2013/0336230 A1 | 12/2013 | Zou et al. |
| 2014/0153390 A1 | 6/2014 | Ishii et al. |
| 2014/0179330 A1* | 6/2014 | Du ........................ H04W 76/23 455/450 |
| 2014/0185587 A1* | 7/2014 | Jang ...................... H04W 36/14 370/331 |
| 2014/0243038 A1* | 8/2014 | Schmidt ................. H04W 4/90 455/552.1 |
| 2014/0243040 A1 | 8/2014 | Bienas et al. |
| 2014/0274066 A1 | 9/2014 | Fodor et al. |
| 2014/0307611 A1 | 10/2014 | Tesanovic et al. |
| 2014/0321314 A1 | 10/2014 | Fodor et al. |
| 2014/0334446 A1* | 11/2014 | Lim ...................... H04W 48/20 370/331 |
| 2015/0094064 A1 | 4/2015 | Lei et al. |
| 2015/0126211 A1 | 5/2015 | Morita |
| 2015/0156693 A1 | 6/2015 | Tabet et al. |
| 2015/0237555 A1* | 8/2015 | Kashiwase ............ H04W 36/14 370/329 |
| 2015/0245342 A1 | 8/2015 | Morita |
| 2015/0245394 A1* | 8/2015 | Sharma .................. H04W 36/03 455/434 |
| 2015/0271861 A1 | 9/2015 | Li et al. |
| 2015/0282232 A1* | 10/2015 | Yamazaki ............. H04W 76/14 370/329 |
| 2015/0289182 A1* | 10/2015 | Peisa ..................... H04W 36/14 370/331 |
| 2015/0327311 A1 | 11/2015 | Wei et al. |
| 2016/0007336 A1 | 1/2016 | Fukuta et al. |
| 2016/0057795 A1* | 2/2016 | Kim ...................... H04W 76/14 370/329 |
| 2016/0157292 A1 | 6/2016 | Fukuta et al. |
| 2016/0295621 A1 | 10/2016 | Han et al. |
| 2017/0019822 A1 | 1/2017 | Zhao et al. |
| 2017/0150421 A1* | 5/2017 | Kuge .................... H04W 76/23 |

FOREIGN PATENT DOCUMENTS

| | | |
|---|---|---|
| JP | 2013-211858 A | 10/2013 |
| JP | 2014-504814 A | 2/2014 |
| JP | 2014-522601 A | 9/2014 |
| JP | 2014-522602 A | 9/2014 |
| JP | 2014-207669 A | 10/2014 |
| JP | 2014-532372 A | 12/2014 |
| JP | 2015-012344 A | 1/2015 |
| JP | 2015-508598 A | 3/2015 |
| JP | 2015-508943 A | 3/2015 |
| JP | 2015-536620 A | 12/2015 |
| JP | 5852261 B2 | 2/2016 |
| WO | 2013/183732 A1 | 12/2013 |
| WO | 2014/065167 A1 | 5/2014 |
| WO | 2014/129452 A1 | 8/2014 |
| WO | 2015/139609 A1 | 9/2015 |
| WO | 2015139609 A1 | 9/2015 |

OTHER PUBLICATIONS

International Search Report with Written Opinion of the International Searching Authority issued by the Japan Patent Office for corresponding International Patent Application No. PCT/JP2016/050569, dated Mar. 8, 2016, with a partial English translation.
3GPP TS 36.300 V12.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Mar. 2015.
3GPP TS 36.211 V12.5.0, "3rd Generation Partnership Project; Technical Specification Group Radio Access Network; Evolved Universal Terrestrial Radio Access (E-UTRA); Physical channels and modulation (Release 12)", Mar. 2015.
3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)", Mar. 2015.
3GPP TS 36.213 V12.5.0, "3rd Generation Partnership Project; Technical Specification Group Radio Access Network; Evolved Universal Terrestrial Radio Access (E-UTRA); Physical layer procedures (Release 12)", Mar. 2015.
3GPP TS 36.321 V12.5.0, "3rd Generation Partnership Project; Technical Specification Group Radio Access Network; Evolved Universal Terrestrial Radio Access (E-UTRA); Medium Access Control (MAC) protocol specification (Release 12)", Mar. 2015.
3GPP TS 36.322 V12.2.0, "3rd Generation Partnership Project; Technical Specification Group Radio Access Network; Evolved Universal Terrestrial Radio Access (E-UTRA); Radio Link Control (RLC) protocol specification (Release 12)", Mar. 2015.
3GPP TS 36.323 V12.3.0, "3rd Generation Partnership Project; Technical Specification Group Radio Access Network; Evolved Universal Terrestrial Radio Access (E-UTRA); Packet Data Convergence Protocol (PDCP) specification (Release 12)", Mar. 2015.
3GPP TS 36.331 V12.5.0, "3rd Generation Partnership Project; Technical Specification Group Radio Access Network; Evolved Universal Terrestrial Radio Access (E-UTRA); Radio Resource Control (RRC); Protocol specification (Release 12)", Mar. 2015.
3GPP TS 36.413 V12.5.0, "3rd Generation Partnership Project; Technical Specification Group Radio Access Network; Evolved Universal Terrestrial Radio Access Network (E-UTRAN); S1 Application Protocol (S1AP) (Release 12)", Mar. 2015.
BGPP TS 36.423 V12.5.0, "3rd Generation Partnership Project; Technical Specification Group Radio Access Network; Evolved Universal Terrestrial Radio Access Network (E-UTRAN); X2 application protocol (X2AP) (Release 12)", Mar. 2015.
3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)", Dec. 2013.
Notification of Reasons for Refusal issued by the Japan Patent Office for corresponding Japanese Patent Application No. 2017-560019, dated Apr. 2, 2019, with an English translation.
Notification of Reasons for Refusal issued by the Japan Patent Office for corresponding Japanese Patent Application No. 2017-560019, dated Feb. 5, 2019, with an English translation.

(56) References Cited

OTHER PUBLICATIONS

Non-final Office Action issued by the USPTO for corresponding U.S. Appl. No. 16/025,479 dated Oct. 21, 2019.

International Search Report with Written Opinion of the International Searching Authority issued by the Japan Patent Office for corresponding International Patent Application No. PCT/JP2016/050581, dated Mar. 8, 2016, with a partial English translation.

Notification of Reasons for Refusal issued by the Japan Patent Office for corresponding Japanese Patent Application No. 2017-560027, dated Feb. 5, 2019, with an English translation.

Decision of Dismissal of Amendment issued by the Japan Patent Office for corresponding Japanese Patent Application No. 2017-560027, dated Mar. 24, 2020, with an English translation.

Final Office Action issued by the United States Patent and Trademark Office for corresponding U.S. Appl. No. 16/025,479, dated Apr. 15, 2020.

Non-Final Office Action issued by the United States Patent and Trademark Office for corresponding U.S. Appl. No. 16/025,479, dated Jul. 23, 2020.

Notice of Reasons for Refusal issued by the Japan Patent Office for corresponding Japanese Patent Application No. 2019-192332, dated Oct. 13, 2020, with a full English machine translation.

Office Action issued by the United States Patent and Trademark Office for corresponding U.S. Appl. No. 16/025,479, dated Feb. 3, 2021.

Non-Final Office Action issued by the United States Patent and Trademark Office for corresponding U.S. Appl. No. 16/025,479, dated Jun. 23, 2021.

Final Office Action issued by the United States Patent and Trademark Office for corresponding U.S. Appl. No. 16/025,479, dated Dec. 27, 2021.

Non-Final Office Action issued by the United States Patent and Trademark Office for corresponding U.S. Appl. No. 16/025,479, dated Jun. 14, 2022.

Advisory Action issued by the United States Patent and Trademark Office for corresponding U.S. Appl. No. 16/025,479, dated May 9, 2022.

* cited by examiner

WIRELESS COMMUNICATION APPARATUS, WIRELESS COMMUNICATION SYSTEM, AND PROCESSING METHOD

CROSS-REFERENCE TO RELATED APPLICATION

This application is a continuation application of International Patent Application PCT/JP2016/050569 filed on Jan. 8, 2016 and designated the U.S., the entire contents of which are incorporated herein by reference.

FIELD

The embodiments discussed herein are related to a wireless communication apparatus, a wireless communication system, and a processing method.

BACKGROUND

In recent years, a discussion on next generation wireless communication technologies has been made to achieve higher-speed and higher-capacity wireless communication, and the like in a wireless communication system such as a cellular system that is one of the portable telephone systems. For example, in the 3rd Generation Partnership Project (3GPP) that is a collaboration for standards, a discussion has been made on a communication standard called "LTE-Advanced (LTE-A)."

There is a direct communication between user terminals called "Device-to-Device (D2D) communication" that has the likelihood of being introduced in LTE-A in future and that is one of the communication technologies on which a basic technical discussion has been made in 3GPP. In a cellular communication in the related art, although user terminals are present close to each other, communication is performed with a base station being involved. In contrast, in the D2D communication, the user terminals that are present close to each other perform direct communication without the base station being involved.

Furthermore, a discussion has been made on the introduction of a terminal that possibly performs both the cellular communication and the D2D communication. In a case where, in such a terminal, the cellular communication is performed with the base station being involved, if the D2D communication is possible between the terminal and a terminal that is a communication partner, setting of a communication channel for performing the D2D communication and the D2D communication is performed via the communication channel that is set. Furthermore, in the terminal that possibly performs both the cellular communication and the D2D communication, while the D2D communication is in progress, in a case where a quality of the communication channel that is used for the D2D communication is degraded, switching is caused to occur from the D2D communication to the cellular communication with the base station being involved.

Examples of the related art include Japanese National Publication of International Patent Application No. 2014-504814 and International Publication Pamphlet No. WO 2014/065167.

Example s of the related art include Non-Patent Literature 1 [3GPP TS 36.300 V12.5.0 (2015-03), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2], Non-Patent Literature 2 [3GPP TS 36.211 V12.5.0 (2015-03), 3rd Generation Partnership Project; Technical Specification Group Radio Access Network; Evolved Universal Terrestrial Radio Access (E-UTRA); Physical channels and modulation], Non-Patent Literature 3 [3GPP TS 36.212 V12.4.0 (2015-03), 3rd Generation Partnership Project; Technical Specification Group Radio Access Network; Evolved Universal Terrestrial Radio Access (E-UTRA); Multiplexing and channel coding], Non-Patent Literature 4 [3GPP TS 36.213 V12.5.0 (2015-03), 3rd Generation Partnership Project; Technical Specification Group Radio Access Network; Evolved Universal Terrestrial Radio Access (E-UTRA); Physical layer procedures], Non-Patent Literature 5 [3GPP TS 36.321 V12.5.0 (2015-03), 3rd Generation Partnership Project; Technical Specification Group Radio Access Network; Evolved Universal Terrestrial Radio Access (E-UTRA); Medium Access Control (MAC) protocol specification], Non-Patent Literature 6 [3GPP TS 36.322 V12.2.0 (2015-03), 3rd Generation Partnership Project; Technical Specification Group Radio Access Network; Evolved Universal Terrestrial Radio Access (E-UTRA); Radio Link Control (RLC) protocol specification], Non-Patent Literature 7 [3GPP TS 36.323 V12.3.0 (2015-03), 3rd Generation Partnership Project; Technical Specification Group Radio Access Network; Evolved Universal Terrestrial Radio Access (E-UTRA); Packet Data Convergence Protocol (PDCP) specification], Non-Patent Literature 8 [3GPP TS 36.331 V12.5.0 (2015-03), 3rd Generation Partnership Project; Technical Specification Group Radio Access Network; Evolved Universal Terrestrial Radio Access (E-UTRA); Radio Resource Control (RRC); Protocol specification], Non-Patent Literature 9 [3GPP TS 36.413 V12.5.0 (2015-03), 3rd Generation Partnership Project; Technical Specification Group Radio Access Network; Evolved Universal Terrestrial Radio Access Network (E-UTRAN); S1 Application Protocol (S1AP)], Non-Patent Literature 10 [3GPP TS 36.423 V12.5.0 (2015-03), 3rd Generation Partnership Project; Technical Specification Group Radio Access Network; Evolved Universal Terrestrial Radio Access Network (E-UTRAN); X2 Application Protocol (X2AP)], and Non-Patent Literature 11 [3GPP TR 36.842 V12.0.0 (2013-12), 3rd Generation Partnership Project; Technical Specification Group Radio Access Network; Study on Small Cell enhancements for E-UTRA and E-UTRAN; Higher layer aspects].

SUMMARY

According to an aspect of the invention, provided is a wireless communication apparatus that is used as a second wireless communication apparatus in a wireless communication system that includes a first wireless communication apparatus and a plurality of the second wireless communication apparatuses. The wireless communication apparatus includes: a communication circuit configured to perform wireless communication via a first communication channel between the wireless communication apparatus and one other second wireless communication apparatus, and wireless communication via a second communication channel between the wireless communication apparatus and the first wireless communication apparatus; and a control circuit configured to control the communication circuit to establish the second communication channel between the wireless communication apparatus and the first wireless communication apparatus, and switch from communication with the one other second wireless communication apparatus via the first communication channel to communication via the second communication channel, when a quality of the first communication channel is poorer than a prescribed quality, or when a switching instruction that is a signal at Layer 2 or Layer 3 is received from the one other second wireless communication apparatus, in a case where the wireless communication apparatus operates in an idle mode and where communication between the wireless communication apparatus and the one other second wireless communication apparatus is performed via the first communication channel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the present circumstance, standards for switching between cellular communication and D2D communication are not established. For this reason, specific control that causes switching to occur from D2D communication to cellular communication while suppressing occurrence of a line disconnection is not disclosed.

An object of the technology disclosed in the present application is to provide a wireless communication apparatus, a wireless communication system, and a processing method that are capable of causing switching to occur from a communication channel that is used for the D2D communication or the like to a communication channel that is used for the cellular communication or the like while suppressing the occurrence of the line disconnection.

Wireless communication apparatuses, wireless communication systems, and processing methods according to embodiments that are disclosed in the present application will be described below with reference to the drawings. It is noted that embodiments which will be described are not limited to the technology that is disclosed. Furthermore, it does without saying that the embodiments which will be described below may be suitably combined for implementation.

First Embodiment

Configuration of a Wireless Communication System 10

Figure 1:
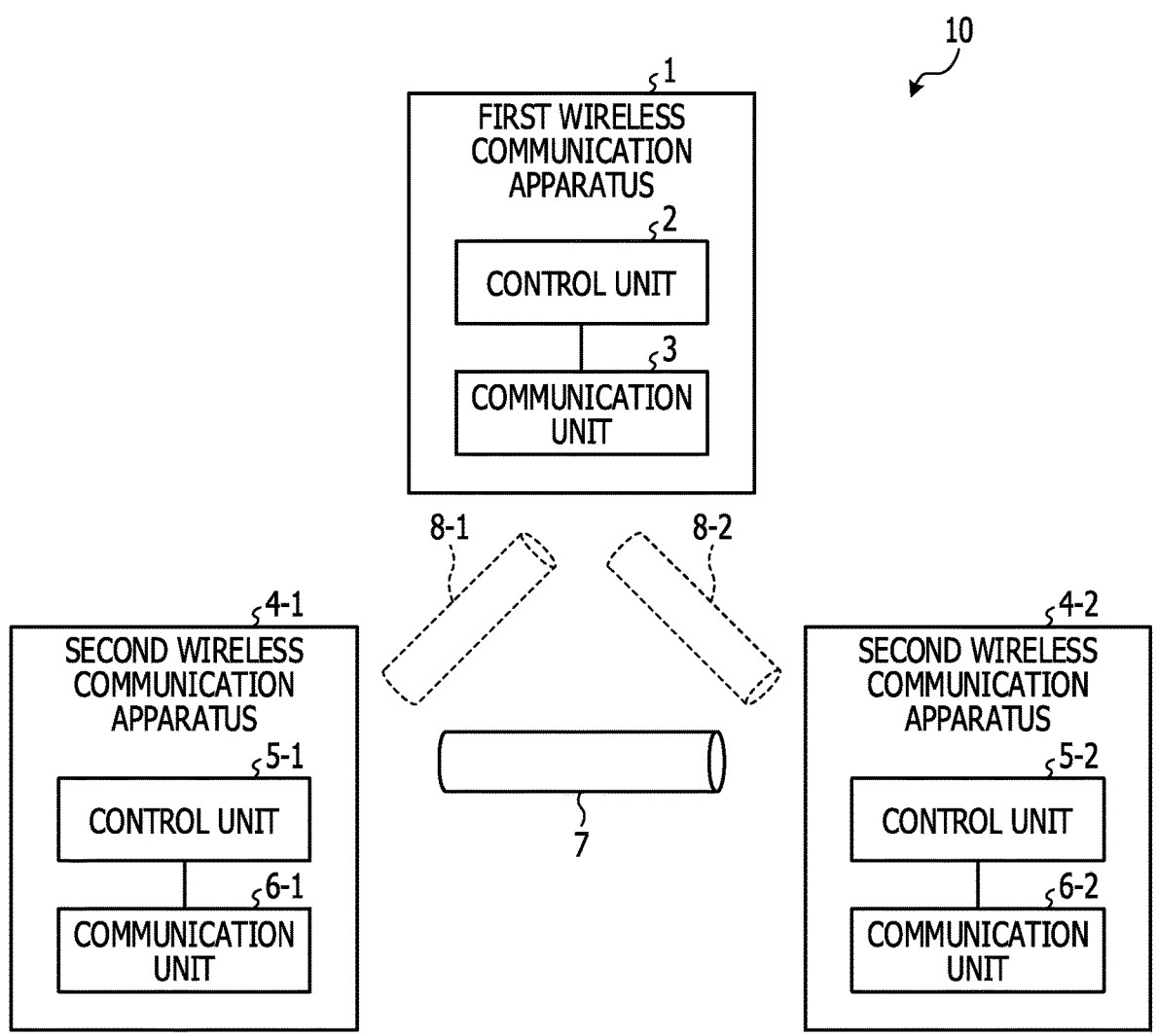
FIG. 1 is a diagram illustrating an example of a wireless communication system according to a first embodiment.

FIG. 1 is a diagram illustrating an example of a wireless communication system 10 according to a first embodiment. The wireless communication system 10 according to the first embodiment includes a first wireless communication apparatus 1, a second wireless communication apparatus 4-1, and a second wireless communication apparatus 4-2. The first wireless communication apparatus 1 has a control unit 2 and a communication unit 3. The second wireless communication apparatus 4-1 has a control unit 5-1 and a communication unit 6-1. The second wireless communication apparatus 4-2 has a control unit 5-2 and a communication unit 6-2. The second wireless communication apparatus 4-1 and the second wireless communication apparatus 4-2 possibly performs wireless communication via a first communication channel 7. Furthermore, the second wireless communication apparatus 4-1 possibly performs wireless communication with the first wireless communication apparatus 1 via a second communication channel 8-1 between the second wireless communication apparatus 4-1 itself and the first wireless communication apparatus 1, and the second wireless communication apparatus 4-2 possibly performs wireless communication with the first wireless communication apparatus 1 via a second communication channel 8-2 between the second wireless communication apparatus 4-2 itself and the first wireless communication apparatus 1. The first communication channel 7 is used, for example, for the D2D communication, and the second communication channels 8-1 and 8-2 are used, for example for the cellular communication.

In the present embodiment, the second wireless communication apparatus 4-1 operates in a radio resource control (RRC) idle mode, and the second wireless communication apparatus 4-2 operates in the RRC idle mode or an RRC connection mode. It is noted that, in some cases, the RRC idle mode and the RRC connection mode are simply described as the idle mode and the connection mode, respectively. The second wireless communication apparatus 4-2 is an example of a third wireless communication apparatus.

It is noted that, in a case where the second wireless communication apparatus 4-1 and the second wireless communication apparatus 4-2 are collectively referred to without being distinguished from each other, the second wireless communication apparatus 4-1 and the second wireless communication apparatus 4-2 will be collectively described below as the second wireless communication apparatus 4. Furthermore, in a case where the control unit 5-1 and the control unit 5-2 are collectively referred to without being distinguished from each other, the control unit 5-1 and the control unit 5-2 will be described below as the control unit 5. In a case where the communication unit 6-1 and the communication unit 6-2 are collectively referred to without being distinguished from each other, the communication unit 6-1 and the communication unit 6-2 will be collectively described below as the communication unit 6. Furthermore, in a case where the second communication channel 8-1 and the second communication channel 8-2 are collectively referred to without being distinguished from each other, the second communication channel 8-1 and the second communication channel 8-2 will be collectively described below as the second communication channel 8.

The communication unit 6 of each second wireless communication apparatus 4 possibly performs wireless communication via the first communication channel 7 between the second wireless communication apparatus 4 itself and one other second wireless communication apparatus 4, and possibly performs wireless communication via the second communication channel 8 between the second wireless communication apparatus 4 itself and the first wireless communication apparatus 1. In a case where the second wireless communication apparatus 4 itself operates in the idle mode and performs communication with one other second wireless communication apparatus 4 via the first communication channel 7, the control unit 5 of each second wireless communication apparatus 4 controls the communication unit 6 and thus performs the following processing. That is, when quality of a quality of the first communication channel 7 is poorer than a predetermined quality, or when a switching instruction is not received from one other second wireless communication apparatus 4, the control unit 5 establishes the second communication channel 8 between the second wireless communication apparatus 4 itself and the first wireless communication apparatus 1. The switching instruction, for example, is a signal at Layer 2 or Layer 3 of Open Systems Interconnection (OSI) Reference Model. Then, the control unit 5 causes the switching to occur from the wireless communication with one other second wireless communication apparatus 4 via the first communication channel 7 to the wireless communication via the second communication channel 8. Accordingly, the second wireless communication apparatus 4-1 in the idle mode and the second wireless communication apparatus 4-2 in the idle mode or the connection mode can realize the switching from the first communication channel 7 that is used for the D2D communication or the like to the second communication channel 8 that is used for the cellular communication or the like while suppressing the occurrence of the line disconnection.

The communication unit 3 of the first wireless communication apparatus 1 possibly performs the wireless communication with the second wireless communication apparatus 4-1 via the second communication channel 8-1, and possibly performs the wireless communication with the second wireless communication apparatus 4-2 via the second communication channel 8-2. In a case where data from the second wireless communication apparatus 4-2, which is destined for the second wireless communication apparatus 4-1, is received via the second communication channel 8-2 between the first wireless communication apparatus 1 itself and the second wireless communication apparatus 4-2, if the second communication channel 8-1 is not established between the first wireless communication apparatus 1 itself and the second wireless communication apparatus 4-1, the control unit 2 of the first wireless communication apparatus 1 controls the communication unit 3, and thus transmits paging information to the second wireless communication apparatus 4-1. Then, the control unit 2 establishes the second communication channel 8-1 between the first wireless communication apparatus 1 itself and the second wireless communication apparatus 4-1, and then transmits the data, which is destined for the second wireless communication apparatus 4-1, to the second wireless communication apparatus 4-1 via the second communication channel 8-1. On the other hand, in a case where the second communication channel 8-1 is established between the first wireless communication apparatus 1 itself and the second wireless communication apparatus 4-1, the control unit 2 controls the communication unit 3 without transmitting the paging information to the second wireless communication apparatus 4-1, and thus transmits the data, which is destined for the second wireless communication apparatus 4-1, to the second wireless communication apparatus 4-1 via the second communication channel 8-1.

In this manner, in a case where the data destined for the second wireless communication apparatus 4-1 that operates in the idle mode is received, if the second communication channel 8-1 is already established between the first wireless communication apparatus 1 itself and the second wireless communication apparatus 4-1, the first wireless communication apparatus 1 transmits the data to the second wireless communication apparatus 4-1 via the second communication channel 8-1. Accordingly, the transmission of the paging information is unnecessary, and delay of the data destined for the second wireless communication apparatus 4-1 can be suppressed. Furthermore, in a case where the data destined for the second wireless communication apparatus 4-1 is received, if the second communication channel 8-1 is not established between the first wireless communication apparatus 1 itself and the second wireless communication apparatus 4-1, the first wireless communication apparatus 1 transmits the paging information to the second wireless communication apparatus 4-1 and establishes the second communication channel 8-1 between the first wireless communication apparatus 1 itself and the second wireless communication apparatus 4-1. Then, the first wireless communication apparatus 1 transmits the data destined for the second wireless communication apparatus 4-1 to the second wireless communication apparatus 4-1 via the second communication channel 8-1 that is established between the first wireless communication apparatus 1 itself and the second wireless communication apparatus 4-1. Accordingly, the delay of the data destined for the second wireless communication apparatus 4-1 can be suppressed within a fixed range.

At this point, several detailed examples of control that is performed by the control unit 5 of each second wireless communication apparatus 4 will be given below. As the first example, in a case where the second wireless communication apparatus 4 itself operates in the idle mode and performs communication with one other second wireless communication apparatus 4 via the first communication channel 7, when a state where the quality of the first communication channel 7 is poorer than the predetermined quality continues for a predetermined time or longer, the control unit 5 performs the following control. That is, the control unit 5 controls the communication unit 6, and thus establishes the second communication channel 8 between the second wireless communication apparatus 4 itself and the first wireless communication apparatus 1 and causes the switching to occur from communication with one other second wireless communication apparatus 4 via the first communication channel 7 to communication via the second communication channel 8. Accordingly, the switching between the communication channels in a case where degradation in the quality of the first communication channel 7 continues for a period of time can be suppressed, and more stable communication is possible.

It is noted that, in the first example, in a case where the paging information is received from the first wireless communication apparatus 1 is received, the control unit 5 performs the following control. That is, at the earliest of a timing at which the time for which the state where the quality of the first communication channel 7 is poorer than the predetermined quality continues reaches a predetermined time and a timing at which the paging information is received, the control unit 5 controls the communication unit 6, and thus establishes the second communication channel 8 between the second wireless communication apparatus 4 itself and the first wireless communication apparatus 1. Then, the control unit 5 causes the switching to occur from the communication with one other second wireless communication apparatus 4 via the first communication channel 7 to the communication via the second communication channel 8. Furthermore, in a case where the time for which the state where the quality of the first communication channel 7 is poorer than the predetermined quality continues the predetermined time before the reception timing of the paging information, the second wireless communication apparatus 4 can suppress the delay of the data destined for the second wireless communication apparatus 4 itself. Furthermore, depending on the radio wave environment, in some cases, a timing at which it is determined that the quality of the first communication channel 7 is poorer than the predetermined quality is delayed. However, even in such a case, with the reception of the paging information, the control unit 5 establishes the second communication channel 8 between the second wireless communication apparatus 4 itself and the first wireless communication apparatus 1. Accordingly, the control unit 5 can suppress the delay of the data destined for the second wireless communication apparatus 4 itself within a predetermined range.

Furthermore, as the second example, in a case where the second wireless communication apparatus 4 itself operates in the idle mode and performs the communication with one other second wireless communication apparatus 4 via the first communication channel 7, when the switching instruction is received from the one other second wireless communication apparatus 4 via the first communication channel 7, the control unit 5 performs the following control. That is, the control unit 5 controls the communication unit 6 and thus performs first processing that replies with a response to the switching instruction. In a case where one other second wireless communication apparatus 4 detects that the quality of the first communication channel 7 is poorer than the predetermined quality, the switching instruction is transmitted from the one other wireless communication apparatus 4 via the first communication channel 7. Furthermore, when the switching instruction is received, the control unit 5 controls the communication unit 6, and thus establishes the second communication channel 8 between the second wireless communication apparatus 4 itself and the first wireless communication apparatus 1 and performs second processing that causes the switching to occur from the communication with one other second wireless communication apparatus 4 via the first communication channel 7 to the communication via the second communication channel 8. Any one of the first processing and the second processing may be performed earlier than the other. The second wireless communication apparatus 4 replies to the one other second wireless communication apparatus 4 with a response to the received switching instruction, and thus can be synchronized to the one other second wireless communication apparatus 4 and can switch between the first communication channel 7 and the second communication channel 8. Accordingly, the time for which the data destined for the second wireless communication apparatus 4 itself stays within an apparatus on a network or within one other second wireless communication apparatus 4. Accordingly, a size of a buffer of equipment provided on the network or one other second wireless communication apparatus 4 can be decreased.

It is noted that, in the second example, even in a case where the switching instruction is not received from the second first wireless communication apparatus 4, if the state where the quality of the first communication channel 7 is poorer than the predetermined quality continues for the predetermined time or longer, the control unit 5 controls the communication unit 6 and thus establishes the second communication channel 8 between the second wireless communication apparatus 4 itself and the first wireless communication apparatus 1. Then, the control unit 5 controls the communication unit 6 and thus causes the switching to occur from the communication with the second wireless communication apparatus 4 via the first communication channel 7 to the communication via the second communication channel 8. Accordingly, the second wireless communication apparatus 4 can suppress more reliably occurrence of disconnection of the communication with one other second wireless communication apparatus 4.

Second Embodiment

Configuration of the Wireless Communication System 10

Figure 2:
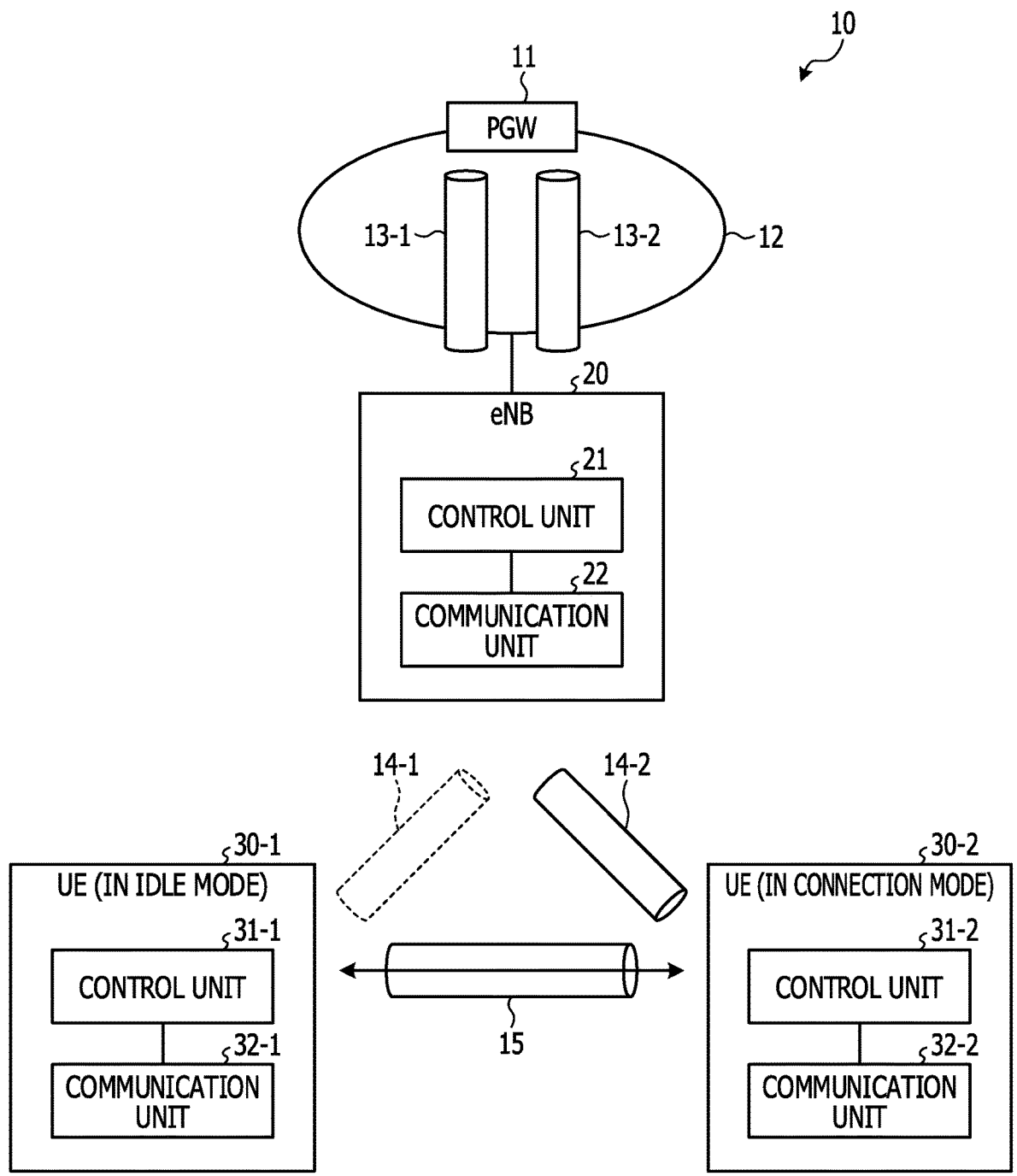
FIG. 2 is a diagram illustrating an example of a wireless communication system according to a second embodiment.

FIG. 2 is a diagram illustrating an example of a wireless communication system 10 according to a second embodiment. The second embodiment is equivalent to an embodiment that is more specific in concept than the first embodiment. The wireless communication system 10 according to the second embodiment includes an evolved Node B (eNB) 20, user equipment (UE) 30-1, and UE 30-2. The UE 30-1 has a control unit 31-1 and a communication unit 32-1. The UE 30-2 has a control unit 31-2 and a communication unit 32-2. The UE 30-1 and the UE 30-2 possibly perform the D2D communication via the communication channel 15. The communication channel 15 is also referred to as a sidelink radio bearer (SLRB). Furthermore, the UE 30-1 possibly performs the cellular communication with the eNB 20 via a communication channel 14-1 between the UE 30-1 itself and the eNB 20, and the UE 30-2 possibly performs the cellular communication with eNB 20 via a communication channel 14-2 between the UE 30-2 itself and the eNB 20.

It is noted that, in a case where the UE 30-1 and the UE 30-2 are collectively referred to without being distinguished from each other, the UE 30-1 and the UE 30-2 will be collectively described below as the UE 30. Furthermore, in a case where the control unit 31-1 and the control unit 31-2 are collectively referred to without being distinguished from each other, the control unit 31-1 and the control unit 31-2 will be collectively described below as the control unit 31, and, in a case where the communication unit 32-1 and the communication unit 32-2 are collectively referred to without being distinguished from each other, the communication unit 32-1 and the communication unit 32-2 will be collectively described below as the communication unit 32. Furthermore, in a case where the communication channel 14-1 and the communication channel 14-2 are collectively described referred to without being distinguished from each other, the communication channel 14-1 and the communication channel 14-2 will be collectively described below as the communication channel 14. The eNB 20 is an example of a base station, and the UE 30 is an example of a terminal or a mobile station. Furthermore, the eNB 20 is an example of the first wireless communication apparatus 1 according to the first embodiment, and the UE 30 is an example of the second wireless communication apparatus 4 according to the first embodiment. Furthermore, the UE 30-2 is an example of the third wireless communication apparatus. Furthermore, the communication channel 15 is an example of the first communication channel 7 according to the first embodiment, and each communication channel 14 is an example of the second communication channel 8.

The eNB 20 is connected, for example, to a core network 12 such as an evolved packet core (EPC). For initial access from the UE 30, the eNB 20 establishes the communication channel 14 between the eNB 20 itself and the UE 30 and establishes a communication channel 13 between the eNB 20 itself and a packet data network gateway (PGW) 11 on the core network 12. The communication channel 13 and the communication channel 14 is also referred to, for example, as an evolved packet system (EPS). A default bearer is included in, and an individual bearer, as occasion demands, is added to the communication channel 13 and the communication channel 14. Furthermore, the communication channel 14 is also referred to as a wireless bearer. Furthermore, the communication channel 13, the communication channel 14, and the communication channel 15 may be referred to as calls.

In an example in FIG. 2, a communication channel 13-1 and the communication channel 14-1 are established between the UE 30-1 and the PGW 11, and a communication channel 13-2 and the communication channel 14-2 are established between the UE 30-2 and the PGW 11. Accordingly, the UE 30 proceeds to an RRC connection mode. It is noted that, in a case where the communication channel 13-1 and the communication channel 13-2 are collectively referred to without being distinguished from each other, the communication channel 13-1 and the communication channel 13-2 will be collectively described below as the communication channel 13. Then, in a case where data communication is not performed between the eNB 20 and the UE 30 for a predetermined period of time, the communication channel 14 between the eNB 20 and the UE 30 is released, and the UE 30 proceeds to the RRC idle mode. However, even in a case where the UE 30 proceeds to the RRC idle mode, the communication channel 13 is maintained between the eNB 20 and the PGW 11. In the present embodiment, the UE 30-1 operates in the idle mode, and the UE 30-2 operates in the connection mode. It is noted that UE 30-2 may operate in the idle mode.

A communication unit 22 of the eNB 20 possibly performs the wireless communication with the UE 30-1 via the communication channel 14-1, and possibly performs the wireless communication with the UE 30-2 via the communication channel 14-2. A control unit 21 of the eNB 20 controls the communication unit 22 and thus establishes the communication channel 14-2 between the eNB 20 itself and the UE 30-2. Then, the control unit 21 receives data destined for the UE 30-1 that operates in the idle mode, from the UE 30-2 via the communication channel 14-2. Then, in a case where the communication channel 14-1 is not established between the eNB 20 itself and the UE 30-1, the control unit 21 controls the communication unit 22 and thus transmits the paging information to the UE 30-1. Then, the control unit 21 establishes the communication channel 14-2 between the eNB 20 itself and the UE 30-1, and then transmits the destined for the UE 30-1 to the UE 30-1 via the communication channel 14-2. On the other hand, in a case where the communication channel 14-1 is established between the eNB 20 itself and the UE 30-1, the control unit 21 controls the communication unit 22 without transmitting the paging information to the UE 30-1, and thus transmits the data destined for the UE 30-1 to the UE 30-1 via the communication channel 14-1.

In the case where one other piece of UE 30 that is a communication partner is detected, the control unit 31 of the UE 30 controls the communication unit 32 and thus establishes the communication channel 15 between the UE 30 itself and the one other piece of UE 30. The control unit 31 establishes the communication channel 15, for example, using a resource that is allocated from the eNB 20. Then, the control unit 31 of the UE 30 controls the communication unit 32 and thus performs the D2D communication with the one other piece of UE 30 via the established communication channel 15.

Figure 3:
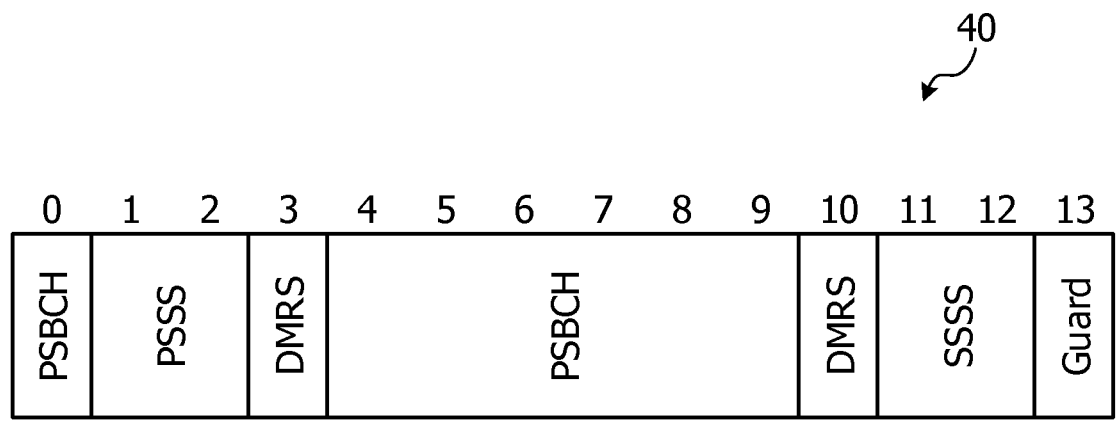
FIG. 3 is a diagram illustrating an example of a format of a synchronization frame that is transmitted and received during D2D communication.

In the D2D communication via the communication channel 15, the UE 30 transmits, for example, a synchronization frame in a format that is illustrated in FIG. 3, with a predetermined periodicity. FIG. 3 is a diagram illustrating an example of a format of a synchronization frame 40 that is transmitted and received during the D2D communication. PSBCH, PSSS, DMRS, SSSS, and a guard are included in the synchronization frame 40. The PSBCH is an acronym for Physical Sidelink Broadcast Channel, and the PSSS is an acronym for Primary Sidelink Synchronization Signal. Furthermore, the DMRS is an acronym for Demodulation Reference Signal, and the SSSS is an acronym for Secondary Sidelink Synchronization Signal.

The control unit 31 of the UE 30 measures a quality of the communication channel 15. The control unit 31, for example, measures reception qualities of the PSSS and the SSSS that are included in the synchronization frame 40, as the quality of the communication channel 15. For example, based on error rates of the PSSS and the SSSS, or the like, the control unit 31 measures a reception quality of the synchronization frame 40. Then, in a case where the quality of the communication channel 15 is poorer than a predetermined quality, the control unit 31 causes a timer that measures a predetermined time, to be reset for restarting. In the present embodiment, the time that is measured by the timer is the time that is equal to or smaller than the processing time that is allowed for processing for a handover, and for example, is the time in a range for several tens milliseconds to 200 milliseconds. Before the timer expires, in a case where the quality of the communication channel 15 is better than a predetermined quality, the control unit 31 causes the timer to stop.

In the UE 30-2 in the connection mode, in a case where the timer expires, the control unit 31 controls the communication unit 32 and thus transmits a first communication channel establishment request to the eNB 20. Then, the control unit 31 updates a setting of the communication channel 14-2 that is already established between the UE 30 itself and the eNB 20, and thus re-establishes the communication channel 14-2 between the UE 30 itself and the eNB 20.

On the other hand, in the UE 30-1 in the idle mode, at the earliest of a timing at which the timer expires and a timing at which the paging information is received from the eNB 20, the control unit 31 controls the control unit 32, and thus transmits a second communication channel establishment request to the eNB 20. Then, the control unit 31 establishes the communication channel 14-1 between the UE 30 itself and the eNB 20. In the present embodiment, the first communication channel establishment request and the second communication channel establishment request are signals at Layer 2 or Layer 3 of the OSI reference model. A default bearer is included in, and an individual bearer, as occasion demands, is added to the communication channel 14-1 or the communication channel 14-2 that is established by the control unit 31 between the UE 30 itself and the eNB 20. Furthermore, when the communication channel 14-1 or the communication channel 14-2 is established between the UE 30 itself and the eNB 20, the control unit 31 performs processing such as semi-persistent scheduling (SPS) activation.

Figure 4:
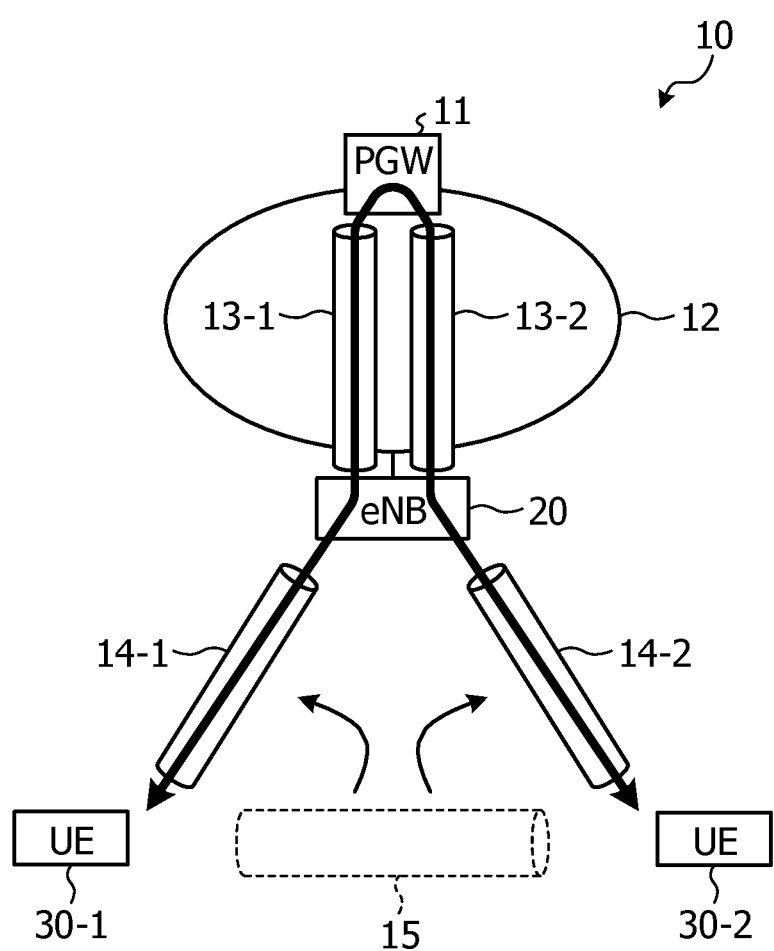
FIG. 4 is a diagram illustrating an example of a flow of data after switching.

Then, the control unit 31 controls the communication unit 32 and thus causes the switching to occur from communication with one other piece of UE 30 via the communication channel 15 to communication via the communication channel 14 that is established between the UE 30 itself and the eNB 20. Accordingly, for example, as illustrated in FIG. 4, the switching is caused to occur from communication between the UE 30-1 and the UE 30-2 via the communication channel 15 to communication via the communication channel 13 and the communication channel 14. FIG. 4 is a diagram illustrating an example of a flow of data after the switching.

Operation of the Wireless Communication System 10

Figure 5:
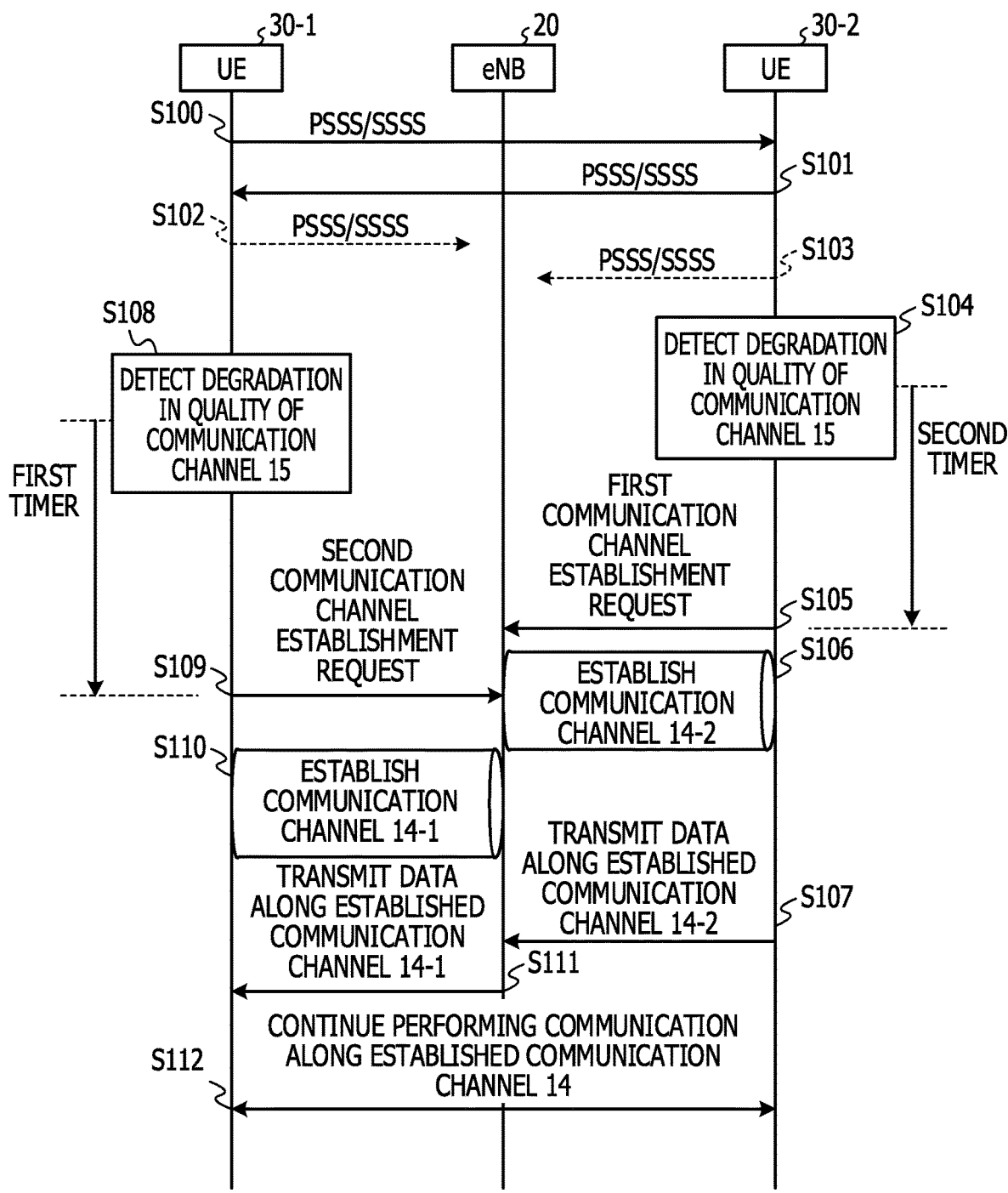
FIG. 5 is a sequence diagram illustrating an example of operation of the wireless communication system according to the second embodiment.

FIG. 5 is a sequence diagram illustrating an example of operation of the wireless communication system 10 according to the second embodiment. It is noted that, before a sequence that is illustrated in FIG. 5, each of the UE 30-1 and the UE 30-2 performs the initial access between each of the UE 30-1 and the UE 30-2 themselves and the eNB 20 and then that the UE 30-1 operates in the idle mode and the UE 30-2 operates in the connection mode. Furthermore, before the sequence that is illustrated in FIG. 5, the UE 30-1 and the UE 30-2 establish the communication channel 15 and perform the D2D communication via the communication channel 15.

First, the UE 30-1 and the UE 30-2 periodically transmit the synchronization frame 40 including the PSSS and the SSSS, via the communication channel 15 (S100 and S101). The UE 30-2 measures the quality of the communication channel 15 based on the reception quality of the synchronization frame 40 that is transmitted from the UE 30-1, and determines whether or not the measured quality of the communication channel 15 is poorer than the predetermined quality.

In the case where the quality of the communication channel 15 is poorer than the predetermined quality (S102), a degradation in the quality of the communication channel 15 is detected (S104). In a case where the degradation in the quality of the communication channel 15 is detected, the UE 30-2 causes a second timer that measures a predetermined time, to be reset for restarting. Then, in a case where the second timer expires, the UE 30-2 that operates in the connection mode transmits the first communication channel establishment request to the eNB 20 (S105) and establishes the communication channel 14-2 between the UE 30-2 itself and the eNB 20 (S106). Then, the UE 30-2 transmits the data destined for the UE 30-1 to the eNB 20 via the communication channel 14-2 that is established between the UE 30-2 itself and the eNB 20 (S107). It is noted that, in the case of the operation in the idle mode, with the expiration of the second timer, the UE 30-2 transmits the second communication channel establishment request to the eNB 20 and establishes the communication channel 14-2 between the UE 30-2 and the eNB 20.

In the same manner as the UE 30-2, the UE 30-1 also measures the quality of the communication channel 15 based on the reception quality of the synchronization frame 40 that is transmitted from the UE 30-2, and determines whether or not the measured quality of the communication channel 15 is poorer than the predetermined quality. In the case where the quality of the communication channel 15 is poorer than the predetermined quality (S103), the UE 30-1 detects the degradation in the quality of the communication channel 15 is detected (S108).

In the case where the degradation in the quality of the communication channel 15 is detected, the UE 30-1 causes a first timer that measures a predetermined time, to be reset for restarting. Then, at the earliest of the timing at which the timer expires and the timing at which the paging information is received from the eNB 20, the UE 30-1 transmits the second communication channel establishment request to the eNB 20 (S109). In an example in FIG. 5, because the first timer expires before receiving the paging information from the eNB 20, the UE 30-1 transmits the second communication channel establishment request to the eNB 20 at a timing at which the first timer expires. Then, the UE 30-1 establishes the communication channel 14-1 between the UE 30-1 itself and the eNB 20 (S110).

In a case where, in Step S107, the data destined for the UE 30-1 is received via the communication channel 14-2, the eNB 20 determines whether or not the communication channel 14-1 is established between the eNB 20 itself and the UE 30-1. In the example in FIG. 5, before the eNB 20 receives the data destined for the UE 30-1 via the communication channel 14-2 in Step S107, the communication channel 14-1 is established between the eNB 20 itself and the UE 30-1 in Step S110. For this reason, the eNB 20 transmits the data destined for the UE 30-1 to the UE 30-1 via the communication channel 14-1 without transmitting the paging information to the UE 30-1 (S111). Then, each of the UE 30-1 and the UE 30-2 causes the switching to occur from communication via the communication channel 15 to the communication via the communication channel 14 that is established between each of the UE 30-1 and the UE 30-2 themselves and the eNB 20, and continues performing the communication (S112).

In this manner, in a case where, during communication with one other piece of UE 30 via the communication channel 15, a state where the quality of the communication channel 15 is poorer than the predetermined quality continues for a predetermined time or longer, the UE 30 according to the present embodiment establishes the communication channel 14 between the UE 30 itself and the eNB 20. Then, the UE 30 causes the switching to occur from the communication with one other piece of UE 30 via the communication channel 15 to the communication via the communication channel 14. Accordingly, the UE 30 can suppress the occurrence of the disconnection of the communication with one other piece of UE 30 due to the degradation in the quality of the communication channel 15.

Data Communication to the UE 30-1 in the Idle Mode in the Related Art

Figure 6:
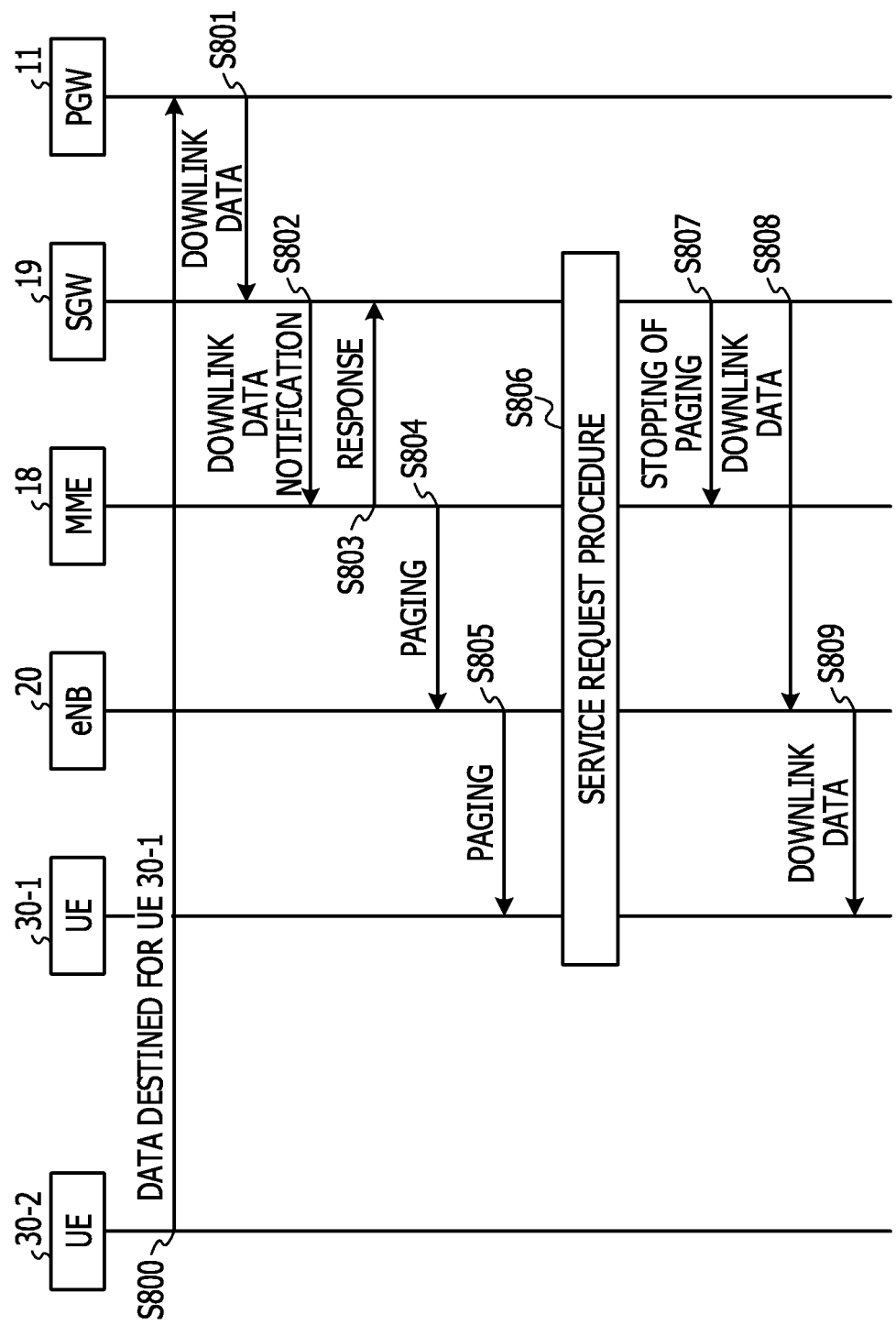
FIG. 6 is a sequence diagram illustrating an example of operation of a wireless communication system in the related art in a case where data is transmitted to UE in an idle mode.

At this point, data communication to the UE 30-1 in the idle mode in the related art will be described. FIG. 6 is a sequence diagram illustrating an example of operation of a wireless communication system in the related art in a case where data is transmitted to the UE 30-1 in the idle mode. In FIG. 6, a mobility management entity (MME) 18 and a serving gateway (SGW) 19 are apparatuses that are included on the core network 12.

First, the UE 30-2 that operates in the connection mode transmits the data destined for the UE 30-1 in the idle mode to the eNB 20 via the communication channel 14-2 that is established between the UE 30-1 itself and the eNB 20. The data destined for the UE 30-1 is sent to the PGW 11 through the eNB 20 (S800). Then, the data destined for the UE 30-1 is sent, as downlink data, from the PGW 11 to the SGW 19 (S801).

In a case where the data destined for the UE 30-1 is received from the PGW 11, because the communication channel 14-1 is not established between the UE 30-1, which is a destination of the data, and the eNB 20, the SGW 19 retains the data destined for the UE 30-1. Then, the SGW 19 transmits a downlink data notification indicating arrival of the data destined for the UE 30-1 to the MME 18 (S802). The MME 18 replies with a response to the downlink data notification (S803), and transmits the information on the paging of the UE 30-1 that is a destination of the data, to the eNB 20 (S804). The eNB 20 transmits the paging information to the UE 30-1 on a control channel (S805).

The UE 30-1 that receives the paging information transmits a NAS service request to the eNB 20, and thus executes a service request procedure between the eNB 20, the MME 18, and the SGW 19 (S806). In the service request procedure, processing is performed such as establishment of the communication channel 14-1 between the UE 30-1 and the eNB 20, authentication of the UE 30-1, or control that conceals data.

In a case where the service request procedure is finished, the SGW 19 instructs the MME 18 to stop the paging (S807). Then, the SGW 19 transmits the data destined for the UE 30-1, as the downlink data, to the eNB 20 (S808). The eNB 20 receives the data destined for the UE 30-1 from the SGW 19, and transmits the received data, as the downlink data, via the communication channel 14-1 that is established between the eNB 20 itself and the UE 30-1 (S809).

Data Communication to the UE 30-1 in the Idle Mode in the Present Embodiment

Figure 7:
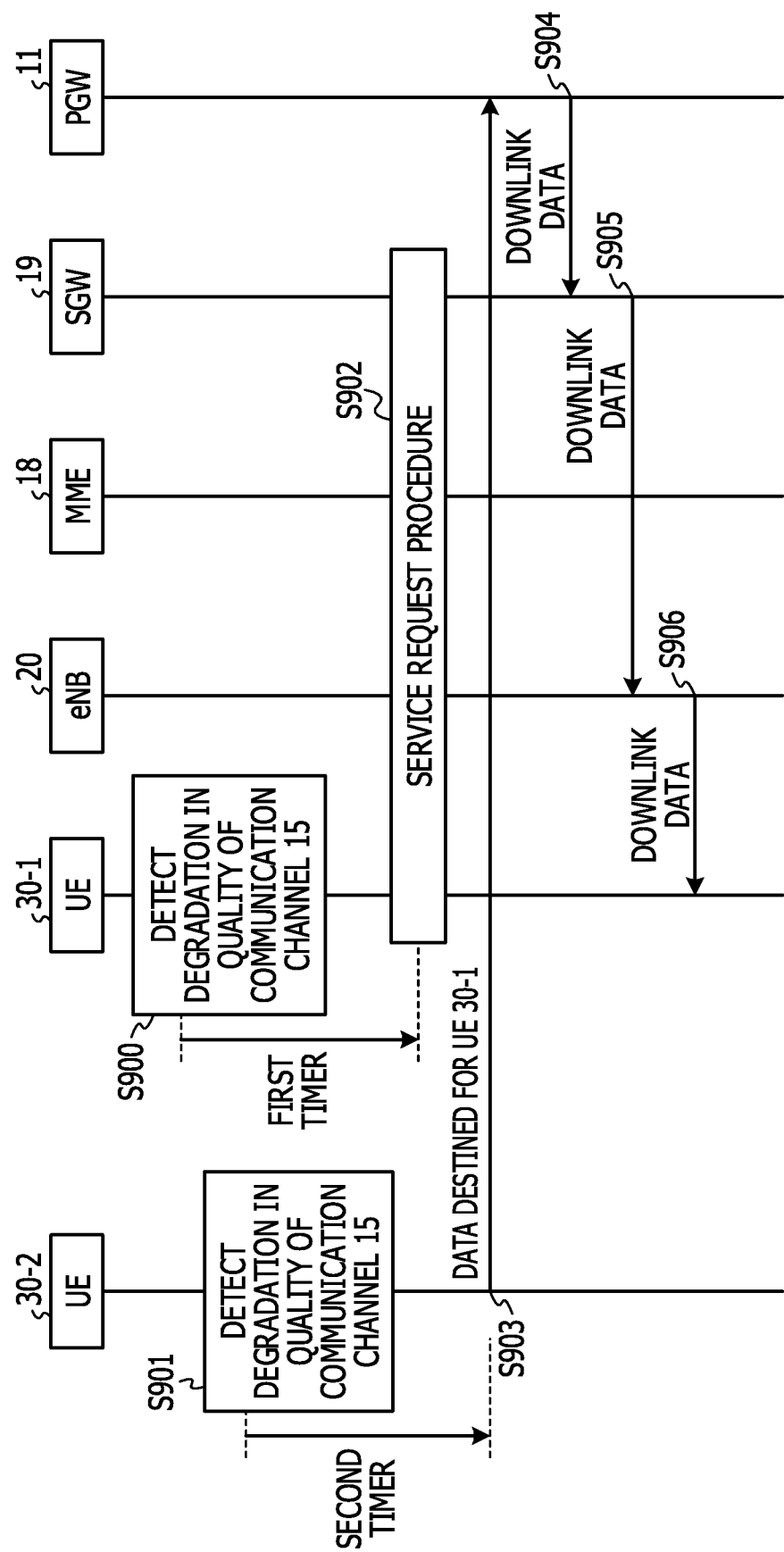
FIG. 7 is a sequence diagram illustrating an example of operation of the wireless communication system according to the second embodiment in the case where the data is transmitted to the UE in the idle mode.

FIG. 7 is a sequence diagram illustrating an example of operation of the wireless communication system 10 according to the second embodiment in the case where data is transmitted to the UE 30-1 in the idle mode.

The UE 30-1 that operates in the idle mode detects the degradation in the quality of the communication channel 15 (S900), and causes the first timer to be reset for restarting. Then, in a case where the first timer expires, the UE 30-1 transmits the second communication channel establishment request to the eNB 20, and thus executes the service request procedure between the eNB 20, the MME 18, and the SGW 19 (S902). Accordingly, the communication channel 14-1 is established between the UE 30-1 and the eNB 20.

On the other hand, the UE 30-2 that operates in the connection mode also detects the degradation of the quality of the communication channel 15 (S901) and causes the second timer to be reset for restarting. Then, in the case where the first timer expires, the UE 30-1 establishes the communication channel 14-2 between the UE 30-1 itself and the eNB 20, and transmits the data destined for the UE 30-1 to the eNB 20 via the communication channel 14-2. The data destined for the UE 30-1 is sent to the PGW 11 through the eNB 20 (S903). Then, the data destined for the UE 30-1 is sent, as downlink data, from the PGW 11 to the SGW 19 (S904).

In the case where the data destined for the UE 30-1 is received from the PGW 11, because the communication channel 14-1 is already established between the UE 30-1, which is the destination of the data, and the eNB 20, the SGW 19 transmits the data destined for the UE 30-1, as the downlink data, to the eNB 20 (S905). The eNB 20 transmits the data destined for the UE 30-1, as the downlink data, to the UE 30-1 via the communication channel 14-1 that is established between the eNB 20 itself and the UE 30-1, without transmitting the paging information to the UE 30-1 (S906).

In data communication in the related art, which is illustrated in FIG. 6, at a point in time at which the data destined for the UE 30-1 is transmitted from the UE 30-2, the communication channel 14-1 is not established between the UE 30-1 and the eNB 20. For this reason, the eNB 20 transmits the paging information to the UE 30-1, and thus establishes the communication channel 14-1 between the eNB 20 itself and the UE 30-1. However, it takes a predetermined time to receive the paging time. Moreover, because the UE 30-1 in the idle mode receives the paging information and then executes the service request procedure, it takes the predetermined time for the communication channel 14-1 to be established between the UE 30-1 and the eNB 20. For this reason, in some cases, the delay of the data destined for the UE 30-1 in the idle mode is increased.

In contrast, in the data communication according to the present embodiment, which is illustrated in FIG. 7, in the case where the degradation in the quality of the communication channel 15 is detected, the UE 30-1 in the idle mode voluntarily establishes the communication channel 14-1 in the UE 30-1 itself and the eNB 20. For this reason, at the point in time at which the data destined for the UE 30-1 is transmitted from the UE 30-2, there is an increased probability that the communication channel 14-1 will be already established between the UE 30-1 and the eNB 20. For this reason, the eNB 20 can transmit data to the UE 30-1 via the communication channel 14-1 that is already established, without transmitting the paging information to the UE 30-1. For this reason, the delay of the data destined for the UE 30-1 in the idle mode can be decreased.

Figure 8:
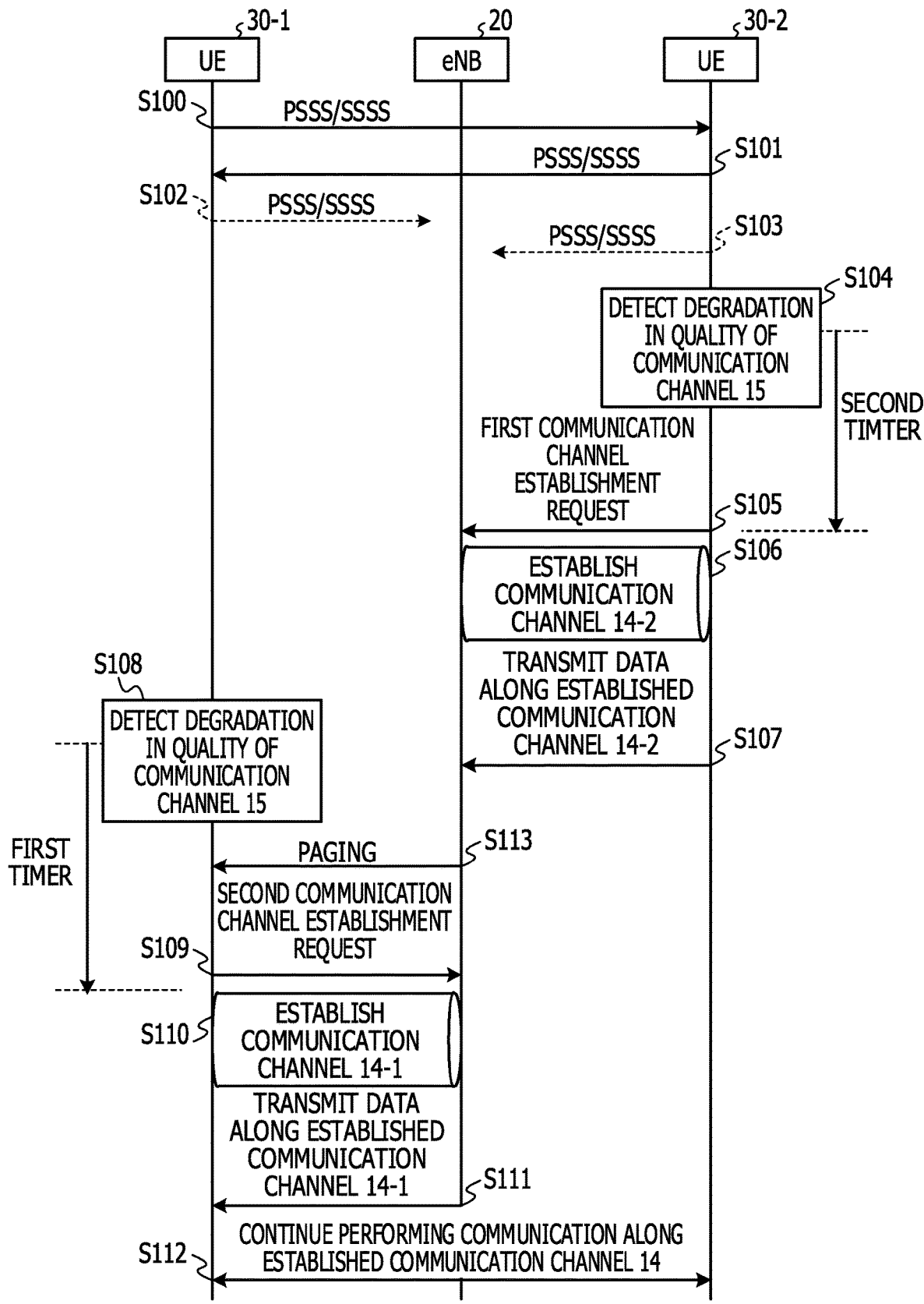
FIG. 8 is a sequence diagram illustrating an example of operation of the wireless communication system according to the second embodiment in a case where paging information is transmitted.

Case where a Timing Varies at which the Degradation in the Quality of the Communication Channel 15 is Detected It is noted that, due to a wireless environment of the communication channel 15, in some cases, a timing at which the degradation in the quality of the communication channel 15 is detected varies between the UE 30-1 and the UE 30-2. Operation of the wireless communication system 10 in such an environment will be described below. FIG. 8 is a sequence diagram illustrating an example of operation of the wireless communication system 10 according to the second embodiment in a case where the paging information is transmitted. It is noted that, except for what will be described below, in FIG. 8, processing that is given the same reference numeral as in FIG. 5 is the same as that which is described with reference to FIG. 5 and thus that a description thereof is omitted.

In an example in FIG. 8, the UE 30-1 detects the degradation in the quality of the communication channel 15 at a later timing than the UE 30-2 (S108). For this reason, a point in time at which the first timer expires is also a late timing. In the case where, in Step S107, the data destined for the UE 30-1 is received via the communication channel 14-2, the eNB 20 determines whether or not the communication channel 14-1 is established between the eNB 20 itself and the UE 30-1. In the example in FIG. 8, at a point in time at which the eNB 20 receives the data destined for the UE 30-1 via the communication channel 14-2 in Step S107, the communication channel 14-1 is not established between the eNB 20 itself and the UE 30-1. For this reason, the eNB 20 transmits the paging information to the UE 30-1 (S113). The UE 30-1 transmits the second communication channel establishment request to the eNB 20 according to the paging information from the eNB 20 (S109). Accordingly, the communication channel 14-1 is established between the UE 30-1 and the eNB 20 (S110). Then, the eNB 20 transmits the data destined for the UE 30-1 to the UE 30-1 via the established communication channel 14-1 (S111). Then, each of the UE 30-1 and the UE 30-2 causes the switching to occur from the communication via the communication channel 15 to the communication via the communication channel 14 that is established between each of the UE 30-1 and the UE 30-2 themselves and the eNB 20, and continues performing the communication (S112).

In this manner, in a case where the paging information is received from the eNB 20 before the first timer expires, with the reception of the paging information, the UE 30-1 in the idle mode establishes the communication channel 14-2 between the UE 30-1 itself and the eNB 20. Accordingly, even in a case where a timing at which the degradation in the quality of the communication channel 15 is detected differs between the UE 30-1 and the UE 30-2, the wireless communication system 10 according to the present embodiment can suppress the delay of the data destined for the UE 30-1 in the idle mode within a predetermined range.

Figure 9:
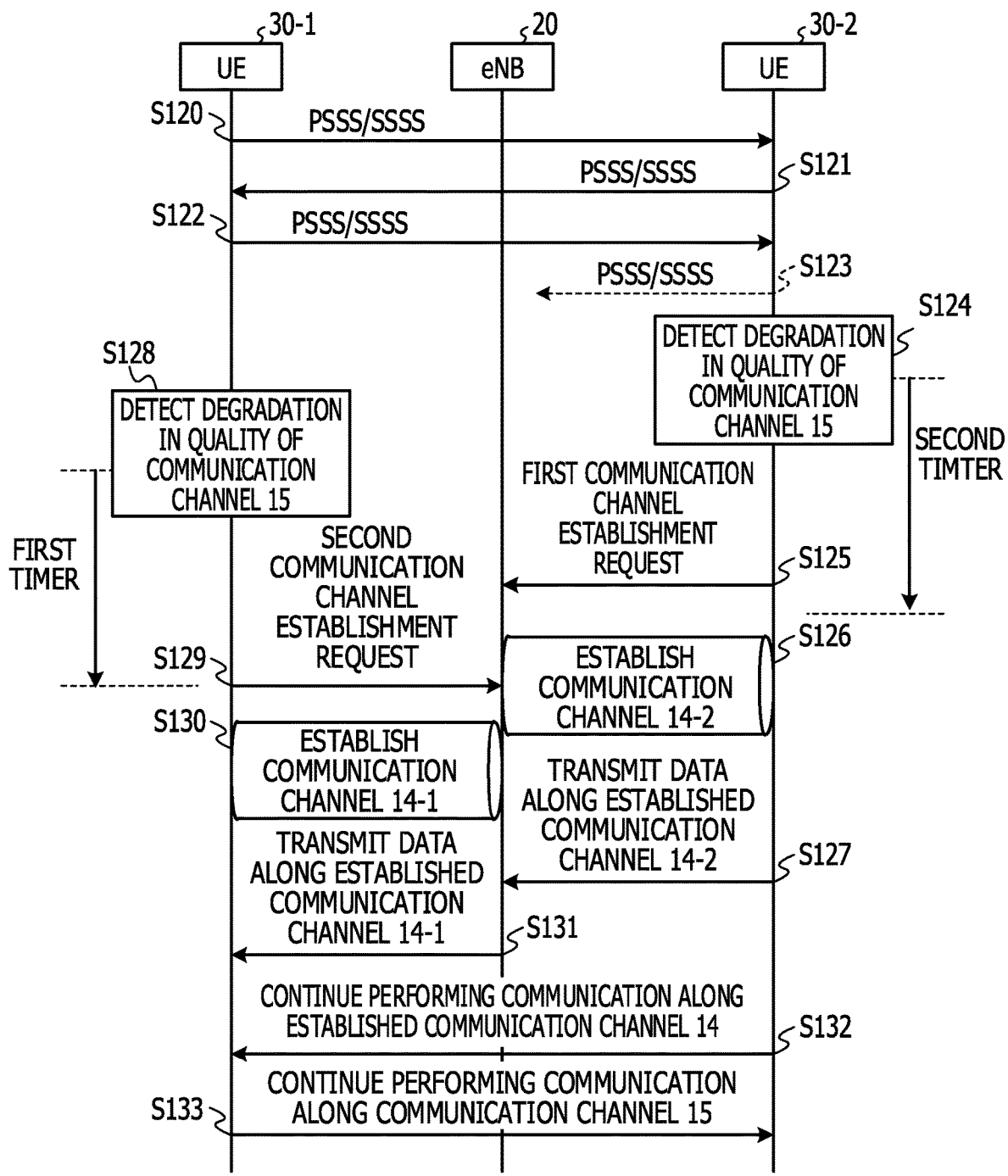
FIG. 9 is a sequence diagram illustrating an example of operation of the wireless communication system in a case where a quality of a communication channel in one direction is degraded, in the second embodiment.

Operation of the Wireless Communication System 10 in a Case where the Quality of the Communication Channel 15 in One Direction is Degraded Furthermore, due to the wireless environment of the communication channel 15, in some cases, one of the communication channel 15 via which a signal is transmitted from the UE 30-1 to the UE 30-2 and the communication channel 15 via which a signal is transmitted from the UE 30-2 to the UE 30-1 degrades a quality of the other. Operation of the wireless communication system 10 in such a situation will be described below. FIG. 9 is a sequence diagram illustrating an example of operation of the wireless communication system 10 in a case where the quality of the communication channel 15 in one direction is degraded, in the second embodiment. It is noted that, in an example that is illustrated in FIG. 9, the communication channel 14 and the communication channel 15 via which a signal is transmitted from the UE 30-1 to the UE 30-2, and the communication channel 14 and the communication channel 15 via which a signal is transmitted from the UE 30-2 to the UE 30-1 are separately managed.

First, the UE 30-1 and the UE 30-2 periodically transmit the synchronization frame 40 including the PSSS and the SSSS, via the communication channel 15 (S120 and S121). The UE 30-2 measures the quality of the communication channel 15 based on the reception quality of the synchronization frame 40 that is transmitted from the UE 30-1, and determines whether or not the measured quality of the communication channel 15 is poorer than the predetermined quality. In the example that is illustrated in FIG. 9, it is assumed that the quality of the communication channel 15 via which a signal is transmitted from the UE 30-1 to the UE 30-2 is better than the quality of the predetermined quality (S122), but that the quality of the communication channel 15 via which a signal is transmitted from the UE 30-2 to the UE 30-1 is poorer than the predetermined quality (S123).

Because the quality of the communication channel 15 via which a signal is transmitted from the UE 30-2 to the UE 30-1 is poorer than the predetermined quality, in some cases, the UE 30-1 fails to receive data that is transmitted from the UE 30-2 via the communication channel 15. In a case where the UE 30-1 fails to receive the data that is transmitted from the UE 30-2, the UE 30-1 does not reply with a response to the data that is transmitted from the UE 30-2. For this reason, the UE 30-2 fails to receive the response to the data that is transmitted to the UE 30-1 via the communication channel 15. Although the quality of the communication channel 15 via which a signal is transmitted from the UE 30-1 to the UE 30-2 is better than the predetermined quality, in a case where the UE 30-2 fails a predetermined number of times to receive the response to the data that is transmitted to the UE 30-1 via the communication channel 15, the UE 30-2 detects the degradation in the quality of the communication channel 15 (S124).

In the case where the degradation in the quality of the communication channel 15 is detected, the UE 30-2 causes the second timer to be reset for restarting. Then, in the case where the second timer expires, the UE 30-2 transmits the first communication channel establishment request that requests establishment of the communication channel 14-2 via which a signal is transmitted from the UE 30-2 to the UE 30-1, to the eNB 20 (S125). Then, the UE 30-2 establishes the communication channel 14-2 via which a signal is transmitted from the UE 30-2 to the UE 30-1, between the UE 30-2 itself and the eNB 20 (S126). Then, the UE 30-2 transmits the data destined for the UE 30-1 to the eNB 20 via the established communication channel 14-2 (S127).

On the other hand, the UE 30-1 in the idle mode detects the degradation in the quality of the communication channel 15 (S128), and causes the first timer to be reset for restarting. Then, in the case where the first timer expires, the UE 30-1 transmits the second communication channel establishment request that requests establishment of the communication channel 14-1 via which a signal is transmitted from the UE 30-2 to the UE 30-1, to the eNB 20 (S129). Then, the UE 30-1 establishes the communication channel 14-1 via which a signal is transmitted from the UE 30-2 to the UE 30-1, between the UE 30-1 itself and the eNB 20 (S130).

In a case where, in Step S127, the data destined for the UE 30-1 is received via the communication channel 14-2, the eNB 20 determines whether or not the communication channel 14-1 is established between the eNB 20 itself and the UE 30-1. In an example in FIG. 9, before the eNB 20 receives the data destined for the UE 30-1 via the communication channel 14-2 in Step S127, the communication channel 14-1 is established between the eNB 20 itself and the UE 30-1 in Step S130. For this reason, the eNB 20 transmits the data destined for the UE 30-1 to the UE 30-1 via the communication channel 14-1 without transmitting the paging information to the UE 30-1 (S131). It is noted that, in a case where the data destined for the UE 30-1 is received via the communication channel 14-2 in Step S127, if the communication channel 14-1 is not established between the eNB 20 itself and the UE 30-1, the eNB 20 transmits the paging information to the UE 30-1.

Then, each of the UE 30-1 and the UE 30-2 continues performing the communication from the UE 30-2 to the UE 30-1 via the communication channel 14 that is established between each of the UE 30-1 and the UE 30-2 themselves and the eNB 20 (S132). Specifically, the UE 30-2 transmits data, which is destined for UE 30-1, via the communication channel 14-2 that is established between the UE 30-2 itself and the eNB 20, and the UE 30-1 receives the data from the UE 30-2 via the communication channel 14-1 that is established between the UE 30-1 itself and the eNB 20. Furthermore, the communication from the UE 30-1 to the UE 30-2 is continuously performed via the communication channel 15 that is established between the UE 30-1 and the UE 30-2 (S133).

In this manner, in a case where, during communication with one other piece of UE 30 via the communication channel 15, the quality of the communication channel 15 in one direction is degraded, the UE 30 establishes the communication channel 14 between the UE 30 itself and the eNB 20 for the communication in the one direction, of which the quality is degraded. Then, the UE 30 switches the communication in the one direction, of which the quality is degraded, from the communication via the communication channel 15 to the communication via the communication channel 14. Accordingly, the UE 30 can suppress the occurrence of the disconnection of the communication with one other piece of UE 30 due to the degradation in the quality of the communication channel 15 in one direction.

Third Embodiment

In a third embodiment, in a case where the quality of the communication channel 15 that is established between the UE 30 itself and one other piece of UE 30 is degraded to a degree that is lower than a predetermined quality, the UE 30 transmits the switching instruction to the one other piece of UE 30 in communication, via the communication channel 15. Then, the UE 30 in transmission via the communication channel 15 establishes the communication channel 14 between the UE 30 itself and the eNB 20. Then, the UE 30 causes the switching to occur from the communication via the communication channel 15 to the communication via the communication channel 14 that is established between the UE 30 itself and the eNB 20. It is noted that a configuration of a wireless communication system 10 according to the present embodiment is the same as that of the wireless communication system 10 according to the second embodiment, which is described with reference to FIG. 2, and thus that a detailed description thereof is omitted. The third embodiment is equivalent to an embodiment that is more specific in concept than the first embodiment.

Operation of the Wireless Communication System 10

Figure 10:
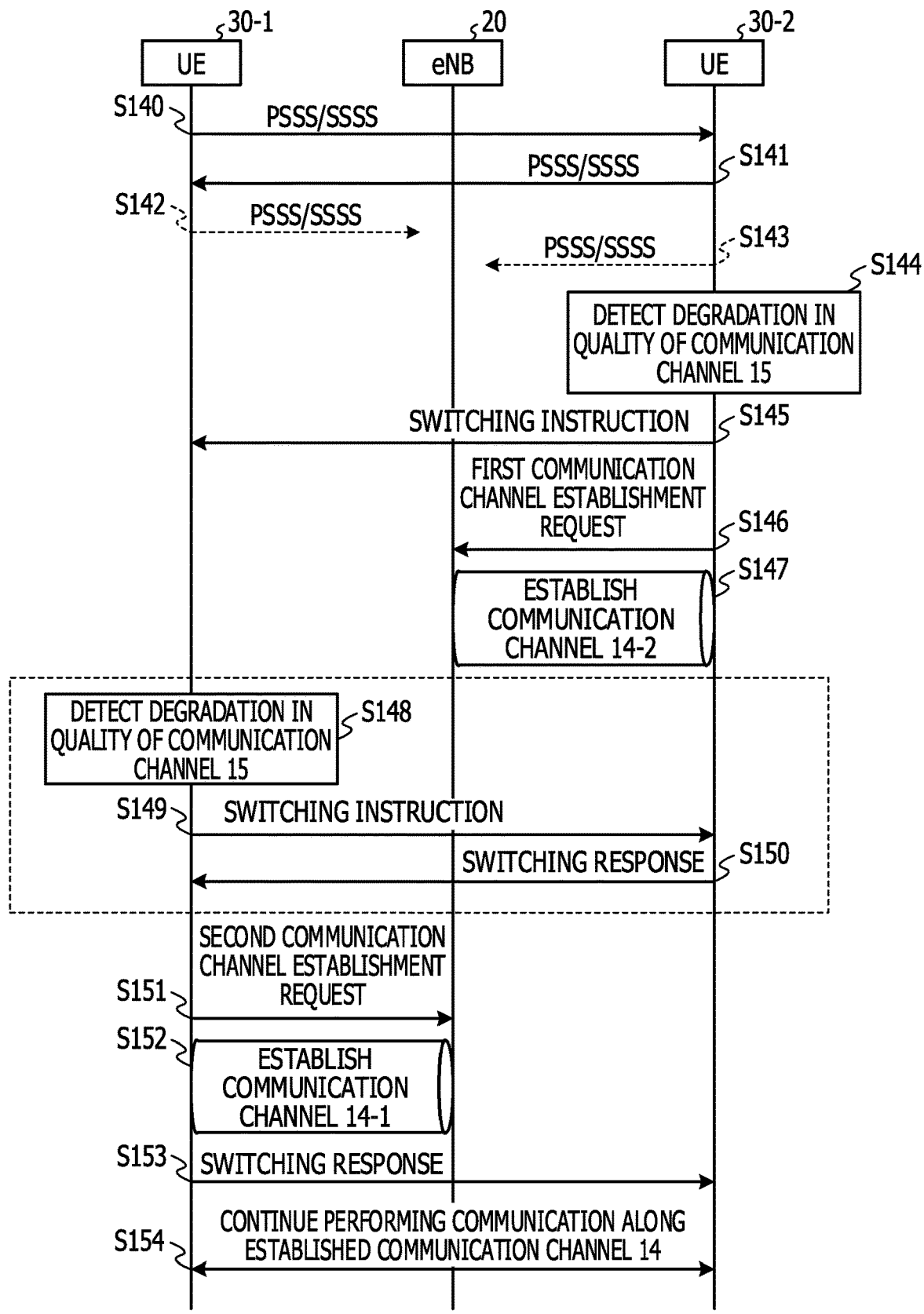
FIG. 10 is a sequence diagram illustrating an example of operation of a wireless communication system according to a third embodiment.

FIG. 10 is a sequence diagram illustrating an example of operation of the wireless communication system 10 according to the third embodiment. It is noted that, before a sequence that is illustrated in FIG. 10, each of the UE 30-1 and the UE 30-2 performs the initial access between each of the UE 30-1 and the UE 30-2 themselves and the eNB 20 and then that the UE 30-1 operates in the idle mode and the UE 30-2 operates in the connection mode. Furthermore, before the sequence that is illustrated in FIG. 10, the UE 30-1 and the UE 30-2 establish the communication channel 15 and perform the D2D communication via the communication channel 15.

First, the UE 30-1 and the UE 30-2 periodically transmit the synchronization frame 40 including the PSSS and the SSSS, via the communication channel 15 (S140 and S141). The UE 30-2 measures the quality of the communication channel 15 based on the reception quality of the synchronization frame 40 that is transmitted from one other piece of UE 30, and determines whether or not the measured quality of the communication channel 15 is poorer than the predetermined quality. Then, it is assumed that the quality of the communication channel 15 is degraded (S142 and S143).

The UE 30-2 detects that the quality of the communication channel 15 is degraded to a degree that is lower than the predetermined quality, and thus detects the degradation in the quality of the communication channel 15 (S144). In the case where the degradation in the quality of the communication channel 15 is detected, the UE 30-2 transmits the switching instruction to the UE 30-1 via the communication channel 15 (S145). The switching instruction, for example, is a signal at Layer 2 or Layer 3 of the OSI reference. Then, the UE 30-2 transmits the first communication channel establishment request to the eNB 20 (S146) and establishes the communication channel 14-2 between the UE 30-2 itself and the eNB 20 (S147).

It is noted that, in a case where there is a master-slave relationship between the UE 30-1 and the UE 30-2, in which one is a master and the other is a slave, the UE 30 that operates as a master may detect the degradation in the quality of the communication channel 15 and may transmit the switching instruction to the UE 30 that operates as a slave. Furthermore, in a case where such a master-slave relationship is not present, for example, as illustrated in Steps S144, S145, S148 to S150, and S153, the UE 30 may detect the degradation in the quality of the communication channel 15 and may transmit the switching instruction to one other piece of UE 30, and the one other piece of UE 30 may reply with a switching response.

In a case where in Step S145, the switching instruction is received from the UE 30-2 via the communication channel 15, the UE 30-1 in the idle mode transmits the second communication channel establishment request to the eNB 20 (S151). Then, the UE 30-1 establishes the communication channel 14-1 between the UE 30-1 itself and the eNB 20 (S152). In a case where the communication channel 14-1 is established between the UE 30-1 itself and the eNB 20, the UE 30-1 replies to the UE 30-2 with the switching response via the communication channel 15 (S153). Then, each of the UE 30-1 and the UE 30-2 causes the switching to occur from the communication via the communication channel 15 to the communication via the communication channel 14 that is established between each of the UE 30-1 and the UE 30-2 themselves and the eNB 20, and continues performing the communication (S154).

In this manner, in a case where, during wireless communication via the communication channel 15 between the UE 30-2 itself and the UE 30-1 in the idle mode, the quality of the communication channel 15 is poorer than the predetermined quality, the UE 30-2 in the connection mode transmits the switching instruction to the UE 30-1 via the communication channel 15. Then, the UE 30-2 establishes the communication channel 14-2 between the UE 30-2 itself and the eNB 20. On the other hand, the UE 30-1 that receives the switching instruction establishes the communication channel 14-1 between the UE 30-1 itself and the eNB 20. Then, the UE 30-1 and the UE 30-2 cause the switching to occur from the communication via the communication channel 15 to the communication via the communication channel 14. Accordingly, the UE 30-1 in the idle mode, although not receiving the paging information from the eNB 20, can establish the communication channel 14-1 between the UE 30-1 itself and the eNB 20. Accordingly, the transmission of the paging information is unnecessary, and the delay of the data destined for the UE 30-1 can be suppressed.

Furthermore, the UE 30-2 establishes the communication channel 14-2 between the UE 30-2 itself and the eNB 20 in a case where the switching instruction is transmitted, and the eNB 20 establishes the communication channel 14-1 between the UE 30-2 itself and the eNB 20 in a case where the switching instruction is received. Accordingly, the UE 30-1 and the UE 30-2 can synchronize communication channels that are used for communication, to each other, and can switch between the communication channels. Accordingly, the time for which transmission data that accompanies the switching from the communication channel 15 stays with a buffer of the UE 30 can be shortened. For this reason, a size of the buffer that is provided within the UE 30 can be decreased.

It is noted that, in an example in FIG. 10, in the case where the degradation in the quality of the communication channel 15 is detected, the UE 30-2 transmits the switching instruction to the UE 30-1 via the communication channel 15, and then establishes the communication channel 14-2 between the UE 30-2 itself and the eNB 20 (S144 to S147). Accordingly, the UE 30-1 can start to establish the communication channel 14-1 without waiting for the UE 30-2 establish the communication channel 14-2. Accordingly, communication channel 14-1 can be established at an earlier stage. In contrast, as another example, in the case where the degradation in the quality of the communication channel 15 is detected, the UE 30-2 may establish the communication channel 14-2 between the UE 30-2 itself and the eNB 20, and then may transmit the switching instruction to the UE 30-1 via the communication channel 15. Accordingly, in a case where the establishment of the communication channel 14-2 fails, the UE 30-2 can be kept from causing the UE 30-1 to unnecessarily establish the communication channel 14-1.

Figure 11:
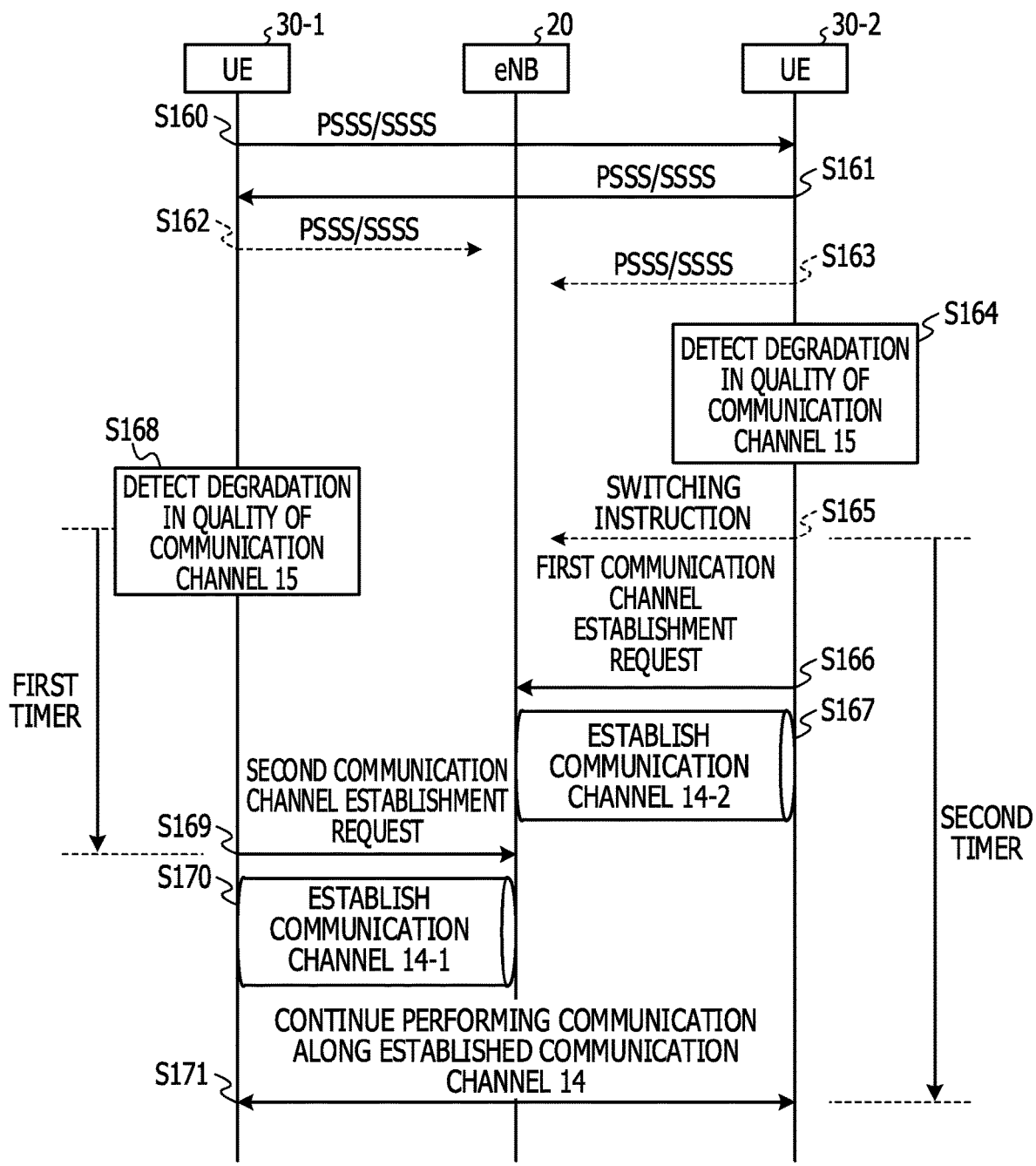
FIG. 11 is a sequence diagram illustrating an example of operation of the wireless communication system in a case where a switching instruction is not received, in the third embodiment.

Operation of the Wireless Communication System 10 in a Case where the Switching Instruction is not Received It is noted that, in a case where the wireless environment of the communication channel 15 abruptly changes, in some cases, the switching instruction that is transmitted from the UE 30-2 to the UE 30-1 is not received in the UE 30-1. A mechanism that, in such a situation, suppresses the occurrence of the disconnection of the communication between pieces of UE 30 themselves will be described below. FIG. 11 is a sequence diagram illustrating an example of operation of the wireless communication system 10 in a case where the switching instruction is not received, in the third embodiment.

First, the UE 30-1 and the UE 30-2 periodically transmit the synchronization frame 40 including the PSSS and the SSSS, via the communication channel 15 (S160 and S161). The UE 30-2 measures the quality of the communication channel 15 based on the reception quality of the synchronization frame 40 that is transmitted from one other piece of UE 30, and determines whether or not the measured quality of the communication channel 15 is poorer than the predetermined quality. Then, it is assumed that the quality of the communication channel 15 is degraded (S162 and S163). The UE 30-2 detects that the quality of the communication channel 15 is degraded to a degree that is lower than the predetermined quality, and thus detects the degradation in the quality of the communication channel 15 (S164).

In the case where the degradation in the quality of the communication channel 15 is detected, the UE 30-2 transmits the switching instruction to the UE 30-1 via the communication channel 15 (S165), and causes the second timer to be reset for restarting. Then, the UE 30-2 transmits the first communication channel establishment request to the eNB 20 (S166) and establishes the communication channel 14-2 between the UE 30-2 itself and the eNB 20 (S167).

In an example in FIG. 11, because the quality of the communication channel 15 is poor, the switching instruction that is transmitted from the UE 30-2 is not received in the UE 30-1. On the other hand, based on the reception quality of the synchronization frame 40 that is received from the UE 30-2, the UE 30-1 detects the degradation in the quality of the communication channel 15 (S168). In the case where the degradation in the quality of the communication channel 15 is detected, the UE 30-1 causes the first timer to be reset for restarting. Then, even in a case where the switching response is not received from the UE 30-2, if the first timer expires, the UE 30-1 transmits the second communication channel establishment request to the eNB 20 (S169). Then, the UE 30-1 establishes the communication channel 14-1 between the UE 30-1 itself and the eNB 20 (S170). Then, the UE 30-1 causes the switching to occur from the communication via the communication channel 15 to the communication via the communication channel 14-1 that is established between the UE 30-1 itself and the eNB 20.

In an example in FIG. 11, because the quality of the communication channel 15 is poor, the switching instruction that is transmitted from the UE 30-2 is not received in the UE 30-1, and the UE 30-1 does not reply to the UE 30-2 with the switching response. However, even in a case where the switching response is not received, if the second timer expires, the UE 30-2 causes the switching to occur from the communication via the communication channel 15 to the communication via the communication channel 14-2 that is established between the UE 30-2 itself and the eNB 20. Accordingly, each of the UE 30-1 and the UE 30-2 continues performing the communication via the communication channel 14 that is established between each of the UE 30-1 and the UE 30-2 themselves and the eNB 20 (S171).

In this manner, even in the case where the switching instruction is not received from the UE 30-2, if the state where the quality of the communication channel 15 is poorer than the predetermined quality continues for the predetermined time or longer, the UE 30-1 establishes the communication channel 14-1 between the UE 30-1 itself and the eNB 20. Then, the UE 30-1 causes the switching to occur from the communication with one other piece of UE 30-2 via the communication channel 15 to the communication via the communication channel 14-1. Furthermore, even in a case where the switching instruction that is transmitted via the communication channel 15 is not received in the UE 30-1, after a predetermined time elapses from when the switching instruction is transmitted, the UE 30-2 causes the switching to occur the communication with the UE 30-2 via the communication channel 15 to the communication via the communication channel 14-2. Accordingly, even in the case where the switching instruction is not received in the UE 30-1, the UE 30-2 can suppress the occurrence of the disconnection of the communication with the UE 30-1 due to the degradation in the quality of the communication channel 15.

It is noted that in a case where the switching instruction can be received from the UE 30-2 via the communication channel 15 before the first timer expires, the UE 30-1 transmits the second communication channel establishment request to the eNB 20 and establishes the communication channel 14-1 between the UE 30-1 itself and the eNB 20. Accordingly, the UE 30-1 can establish the communication channel 14-1 between the UE 30-1 itself and the eNB 20 in an earlier stage.

Furthermore, in the example in FIG. 11, in the case where the degradation in the quality of the communication channel 15 is detected, the UE 30-2 transmits the switching instruction via the communication channel 15 (S164 and S165). In contrast, as another example, in the case where the degradation in the quality of the communication channel 15 is detected, the UE 30-1 may transmit the switching instruction via the communication channel 15. Furthermore, each of the UE 30-1 and the UE 30-2 may detect the degradation in the quality of the communication channel 15 and may transmit the switching instruction via the communication channel 15. Furthermore, in the example in FIG. 11, in the case where the degradation in the quality of the communication channel 15 is detected, the UE 30-2 transmits the switching instruction to the UE 30-1 via the communication channel 15, and then establishes the communication channel 14-2 between the UE 30-2 itself and the eNB 20 (S164 to S167). In contrast, as another example, in the case where the degradation in the quality of the communication channel 15 is detected, the UE 30-2 may establish the communication channel 14-2 between the UE 30-2 itself and the eNB 20, and then may transmit the switching instruction to the UE 30-1 via the communication channel 15.

Figure 12:
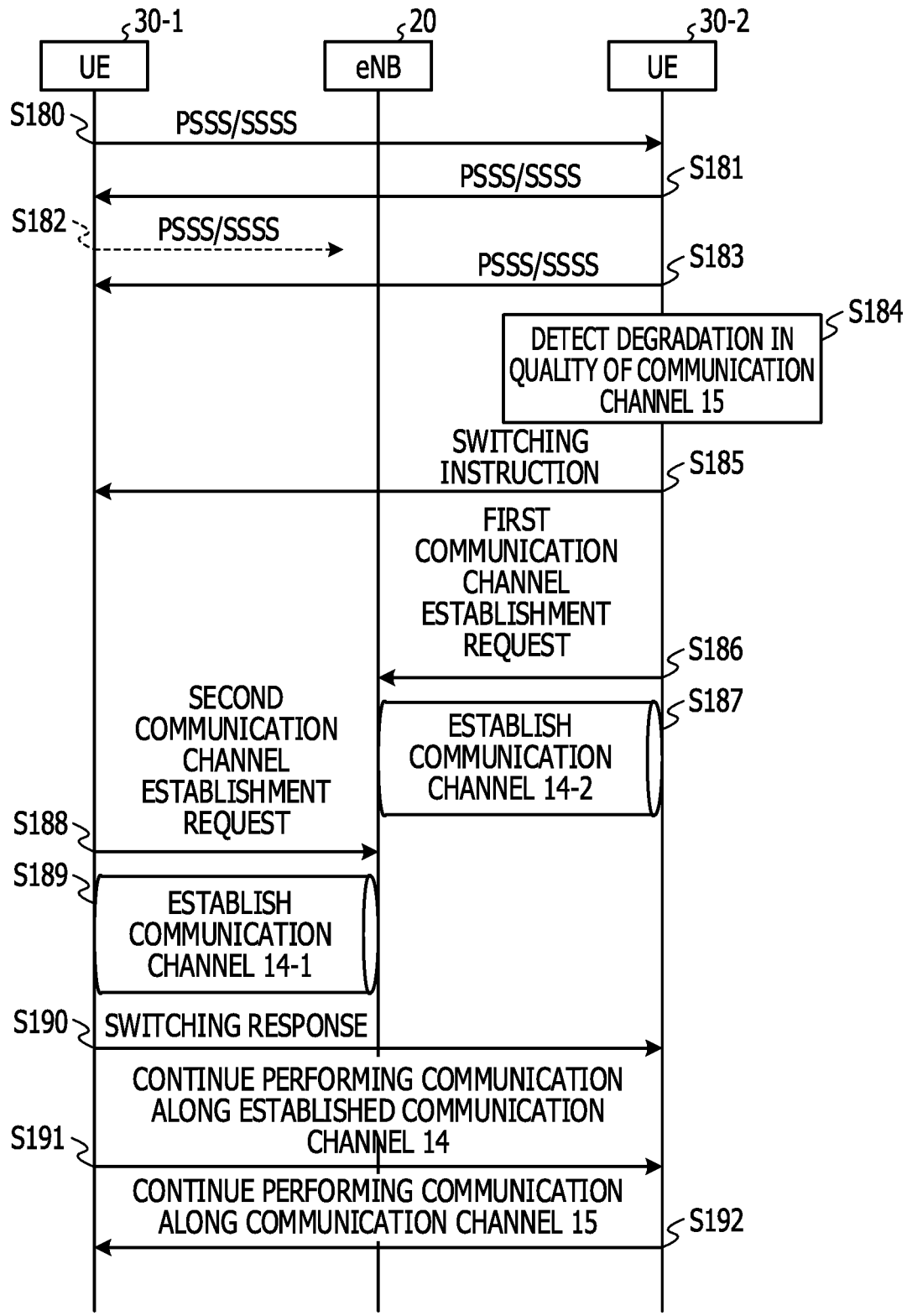
FIG. 12 is a sequence diagram illustrating an example of operation of the wireless communication system in the case where the quality of the communication channel in one direction is degraded, in the third embodiment.

Operation of the Wireless Communication System 10 in the Case where the Quality of the Communication Channel 15 in One Direction is Degraded Furthermore, due to the wireless environment of the communication channel 15, in some cases, one of the communication channel 15 via which a signal is transmitted from the UE 30-1 to the UE 30-2 and the communication channel 15 via which a signal is transmitted from the UE 30-2 to the UE 30-1 degrades the quality of the other. Operation of the wireless communication system 10 in such a situation will be described below. FIG. 12 is a sequence diagram illustrating an example of operation of the wireless communication system 10 in the case where the quality of the communication channel 15 in one direction is degraded, in the third embodiment. It is noted that, in an example that is illustrated in FIG. 12, the communication channel 14 and the communication channel 15 via which a signal is transmitted from the UE 30-1 to the UE 30-2, and the communication channel 14 and the communication channel 15 via which a signal is transmitted from the UE 30-2 to the UE 30-1 are separately managed.

First, the UE 30-1 and the UE 30-2 periodically transmit the synchronization frame 40 including the PSSS and the SSSS, via the communication channel 15 (S180 and S181). The UE 30-2 measures the quality of the communication channel 15 based on the reception quality of the synchronization frame 40 that is transmitted from the UE 30-1, and determines whether or not the measured quality of the communication channel 15 is poorer than the predetermined quality. In the example that is illustrated in FIG. 12, it is assumed that the quality of the communication channel 15 via which a signal is transmitted from the UE 30-1 to the UE 30-2 is degraded to a degree that is lower than the quality of the predetermined quality (S182), but that the quality of the communication channel 15 via which a signal is transmitted from the UE 30-2 to the UE 30-1 is better than the predetermined quality (S183).

The UE 30-2 detects that the quality of the communication channel 15 via which a signal is transmitted from the UE 30-1 to UE 30-2 is degraded to a degree that is lower than the predetermined quality, and thus detects the degradation in the quality of the communication channel 15 (S184). In the case where the degradation in the quality of the communication channel 15 is detected, the UE 30-2 transmits the switching instruction to the UE 30-1 via the communication channel 15 (S185). Then, the UE 30-2 transmits the first communication channel establishment request that requests the establishment of the communication channel 14-2 via which a signal is transmitted from the UE 30-1 to the UE 30-2, to the eNB 20 (S186). Then, the UE 30-2 establishes the communication channel 14-2 via which a signal is transmitted from the UE 30-1 to the UE 30-2, between the UE 30-2 itself and the eNB 20 (S187).

The UE 30-1 receives the switching instruction from the UE 30-2 via the communication channel 15. In an example in FIG. 12, the quality of the communication channel 15 via which a signal may be transmitted from the UE 30-2 to the UE 30-1 is better than the predetermined quality. For this reason, the UE 30-2 transmits the second communication channel establishment request that requests the establishment of the communication channel 14-1 via which a signal is transmitted from the UE 30-1 to the UE 30-2, to the eNB 20 (S188). Then, the UE 30-1 establishes the communication channel 14-1 via which a signal is transmitted from the UE 30-1 to the UE 30-2, between the UE 30-1 itself and the eNB 20 (S189). In the case where the communication channel 14-1 is established, the UE 30-1 replies to the UE 30-2 with the switching response via the communication channel 15 (S190).

Then, each of the UE 30-1 and the UE 30-2 causes the switching to occur from the communication from the UE 30-1 to the UE 30-2 via the communication channel 14 to the communication via the communication channel 14-1 that is established between each of the UE 30-1 and the UE 30-2 themselves and the eNB 20. Then, the UE 30-1 and the UE 30-2 continue performing the communication from the UE 30-1 to the UE 30-2 (S191). Specifically, the UE 30-1 transmits data, which is destined for the UE 30-2, via the communication channel 14-1 that is established between the UE 30-1 itself and the eNB 20, and the UE 30-2 receives the data from the UE 30-1 via the communication channel 14-2 that is established between the UE 30-2 itself and the eNB 20. Furthermore, the communication from the UE 30-2 to the UE 30-1 is continuously performed via the communication channel 15 that is already established between the UE 30-1 and the UE 30-2 (S192).

In this manner, in the case where, during the communication with one other piece of UE 30 via the communication channel 15, the quality of the communication channel 15 in one direction is degraded, the UE 30 transmits the switching instruction to the one other piece of UE 30 via the communication channel 15, and establishes the communication channel 14 between the UE 30 itself and the eNB 20. On the other hand, the UE 30 that receives the switching instruction establishes the communication channel 14 between the UE 30 itself and the eNB 20. Then, the UE 30 switches the communication in the one direction, of which the quality is degraded, from the communication via the communication channel 15 to the communication via the communication channel 14. Accordingly, the UE 30 can suppress the occurrence of the disconnection of the communication with one other piece of UE 30 due to the degradation in the quality of the communication channel 15 in one direction.

It is noted that, in the example in FIG. 12, in the case where the degradation in the quality of the communication channel 15 is detected, the UE 30-2 transmits the switching instruction via the communication channel 15 (S184 and S185). In contrast, as another example, in the case where the degradation in the quality of the communication channel 15 is detected, the UE 30-1 may transmit the switching instruction via the communication channel 15. In this case, the UE 30-1 may include information to the effect that switching from the communication channel 15 via which a signal is transmitted from the UE 30-1 to the UE 30-2 takes place, in the switching instruction. For example, regardless of the fact that the quality of the communication channel 15 via which a signal is transmitted from the UE 30-2 to the UE 30-1 is better than the predetermined quality, the UE 30-1 detects that a response to data which is transmitted to the UE 30-1 via the communication channel 15 is not received. Accordingly, the UE 30-1 includes information to the effect that switching from the communication channel 15 via which a signal is transmitted from the UE 30-1 to the UE 30-2 takes place, in the switching instruction.

Furthermore, each of the UE 30-1 and the UE 30-2 may detect the degradation in the quality of the communication channel 15 and may transmit the switching instruction via the communication channel 15 to each other. Furthermore, in the example in FIG. 12, in the case where the degradation in the quality of the communication channel 15 is detected, the UE 30-2 transmits the switching instruction to the UE 30-1 via the communication channel 15, and then establishes the communication channel 14-2 between the UE 30-2 itself and the eNB 20 (S184 to S187). In contrast, as another example, in the case where the degradation in the quality of the communication channel 15 is detected, the UE 30-2 may establish the communication channel 14-2 between the UE 30-2 itself and the eNB 20, and then may transmit the switching instruction to the UE 30-1 via the communication channel 15.

Figure 13:
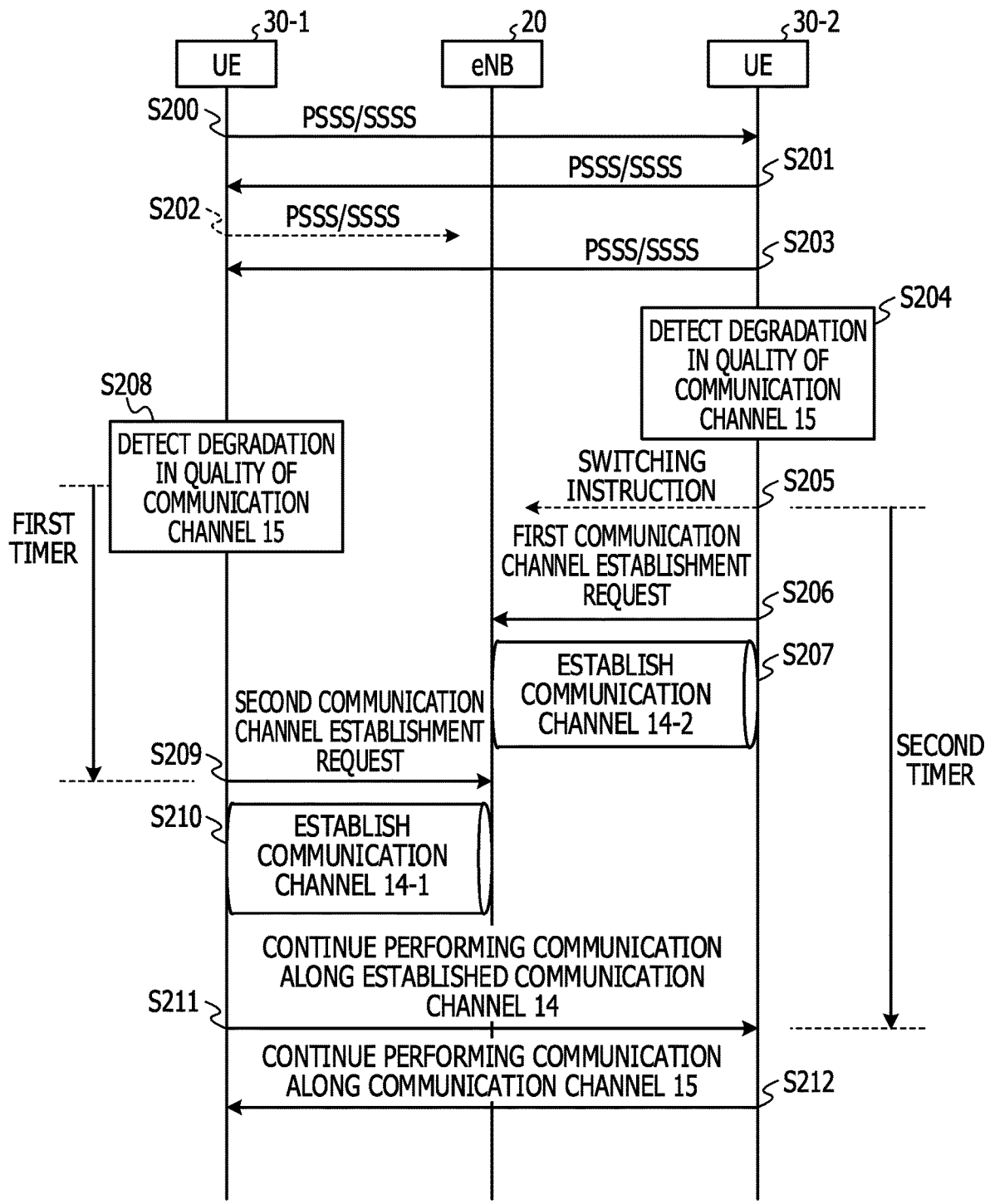
FIG. 13 is a sequence diagram illustrating an example of operation of the wireless communication system in a case where the quality of the communication channel in one direction is degraded and where the switching instruction is not received, in the third embodiment.

Operation of the Wireless Communication System 10 in a Case where the Quality of the Communication Channel 15 is Degraded and where the Switching Instruction is not Received Furthermore, due to the wireless environment of the communication channel 15, in some cases, one of the communication channel 15 via which a signal is transmitted from the UE 30-1 to the UE 30-2 and the communication channel 15 via which a signal is transmitted from the UE 30-2 to the UE 30-1 degrades the quality of the other and via with this, the switching instruction is not received. Operation of the wireless communication system 10 in such a situation will be described below. FIG. 13 is a sequence diagram illustrating an example of operation of the wireless communication system 10 in the case where the quality of the communication channel in one direction is degraded and where the switching instruction is not received, in the third embodiment. It is noted that, in an example that is illustrated in FIG. 13, the communication channel 14 and the communication channel 15 via which a signal is transmitted from the UE 30-1 to the UE 30-2, and the communication channel 14 and the communication channel 15 via which a signal is transmitted from the UE 30-2 to the UE 30-1 are separately managed.

First, the UE 30-1 and the UE 30-2 periodically transmit the synchronization frame 40 including the PSSS and the SSSS, via the communication channel 15 (S200 and S201). The UE 30-2 measures the quality of the communication channel 15 based on the reception quality of the synchronization frame 40 that is transmitted from the UE 30-1, and determines whether or not the measured quality of the communication channel 15 is poorer than the predetermined quality. In the example that is illustrated in FIG. 13, it is assumed that the quality of the communication channel 15 via which a signal is transmitted from the UE 30-1 to the UE 30-2 is degraded to a degree that is lower than the quality of the predetermined quality (S202), but that the quality of the communication channel 15 via which a signal is transmitted from the UE 30-2 to the UE 30-1 is better than the predetermined quality (S203).

The UE 30-2 detects that the quality of the communication channel 15 via which a signal is transmitted from the UE 30-1 to UE 30-2 is degraded to a degree that is lower than the predetermined quality, and thus detects the degradation in the quality of the communication channel 15 (S204). In the case where the degradation in the quality of the communication channel 15 is detected, the UE 30-2 transmits the switching instruction to the UE 30-1 via the communication channel 15 (S205), and causes the second timer to be reset for restarting. Then, the UE 30-2 transmits the first communication channel establishment request that requests the establishment of the communication channel 14-2 via which a signal is transmitted from the UE 30-1 to the UE 30-2, to the eNB 20 (S206). Then, the UE 30-2 establishes the communication channel 14-2 via which a signal is transmitted from the UE 30-1 to the UE 30-2, between the UE 30-2 itself and the eNB 20 (S207).

In an example in FIG. 13, because the quality of the communication channel 15 is poor, the switching instruction that is transmitted from the UE 30-2 is not received in the UE 30-1. For this reason, the UE 30-1 does not reply to the UE 30-2 with the switching response. On the other hand, because the quality of the communication channel 15 via which a signal is transmitted from the UE 30-1 to the UE 30-2 is poorer than the predetermined quality, the data that is transmitted from the UE 30-1 to the UE 30-2 via the communication channel 15 is not received in the UE 30-2. For this reason, the UE 30-1 fails to receive the response to the data that is transmitted to the UE 30-2 via the communication channel 15. Although the quality of the communication channel 15 via which a signal is transmitted from the UE 30-2 to the UE 30-1 is better than the predetermined quality, in a case where the UE 30-2 fails a predetermined number of times to receive the response to the data that is transmitted to the UE 30-1 via the communication channel 15, the UE 30-2 detects the degradation in the quality of the communication channel 15 (S208).

In the case where the degradation in the quality of the communication channel 15 is detected, the UE 30-1 causes the first timer to be reset for restarting. Then, even in a case where the switching instruction is not received from the UE 30-2, if the first timer expires, the UE 30-1 transmits the second communication channel establishment request, which requests the establishment of the communication channel 14-1 via which a signal is transmitted from the UE 30-1 to the UE 30-2, to the eNB 20 (S209). Then, the UE 30-1 establishes the communication channel 14-1 via which a signal is transmitted from the UE 30-1 to the UE 30-2, between the UE 30-1 itself and the eNB 20 (S210). Then, the UE 30-1 causes the switching to occur from the communication from the UE 30-1 to the UE 30-2 via the communication channel 15 to the communication via the communication channel 14-1.

In the example in FIG. 13, because the quality of the communication channel 15 is poor, the switching instruction that is transmitted from the UE 30-2 is not received in the UE 30-1, and the UE 30-1 does not reply to the UE 30-2 with the switching response. However, even in the case where the switching response is not received, if the second timer expires, the UE 30-2 causes the switching to occur from the communication from the UE 30-1 to the UE 30-2 via the communication channel 15 to the communication via the communication channel 14-2.

Then, each of the UE 30-1 and the UE 30-2 continues performing the communication from the UE 30-1 to the UE 30-2 via the communication channel 14 that is established between each of the UE 30-1 and the UE 30-2 themselves and the eNB 20 (S211). Specifically, the UE 30-1 transmits data, which is destined for the UE 30-2, via the communication channel 14-1 that is established between the UE 30-1 itself and the eNB 20, and the UE 30-2 receives the data from the UE 30-1 via the communication channel 14-2 that is established between the UE 30-2 itself and the eNB 20. Furthermore, the communication from the UE 30-2 to the UE 30-1 is continuously performed via the communication channel 15 that is established between the UE 30-1 and the UE 30-2 (S212).

In this manner, even in the case where the switching instruction is not received, if the state where the quality of the communication channel 15 is poorer than the predetermined quality continues for the predetermined time or longer, the UE 30-1 establishes the communication channel 14-1 between the UE 30-1 itself and the eNB 20. Then, the UE 30-1 causes the switching to occur from the communication with the UE 30-2 via the communication channel 15 to the communication via the communication channel 14-1. On the other hand, even in a case where the response to the switching instruction is not received, if the predetermined time elapses from when the switching instruction is transmitted, the UE 30-2 causes the switching to occur the communication with the UE 30-1 via the communication channel 15 to the communication via the communication channel 14-2. Accordingly, the UE 30-1 and the UE 30-2 can suppress the occurrence of the disconnection of the communication due to the degradation in the quality of the communication channel 15.

It is noted that in a case where the switching instruction can be received from the UE 30-2 via the communication channel 15 before the first timer expires, the UE 30-1 transmits the second communication channel establishment request to the eNB 20 and establishes the communication channel 14-1 between the UE 30-1 itself and the eNB 20. Accordingly, the UE 30-1 can establish the communication channel 14-1 between the UE 30-1 itself and the eNB 20 in an earlier stage.

Furthermore, in the example in FIG. 13, in the case where the degradation in the quality of the communication channel 15 is detected, the UE 30-2 transmits the switching instruction via the communication channel 15 (S204 and S205). In contrast, as another example, in the case where the degradation in the quality of the communication channel 15 is detected, the UE 30-1 may transmit the switching instruction via the communication channel 15. In this case, the UE 30-1 may include information to the effect that switching from the communication channel 15 via which a signal is transmitted from the UE 30-1 to the UE 30-2 takes place, in the switching instruction. Furthermore, each of the UE 30-1 and the UE 30-2 may detect the degradation in the quality of the communication channel 15 and may transmit the switching instruction via the communication channel 15. Furthermore, in the example in FIG. 13, in the case where the degradation in the quality of the communication channel 15 is detected, the UE 30-2 transmits the switching instruction to the UE 30-1 via the communication channel 15, and then establishes the communication channel 14-2 between the UE 30-2 itself and the eNB 20 (S204 to S207). In contrast, as another example, in the case where the degradation in the quality of the communication channel 15 is detected, the UE 30-2 may establish the communication channel 14-2 between the UE 30-2 itself and the eNB 20, and then may transmit the switching instruction to the UE 30-1 via the communication channel 15.

Hardware

Figure 14:
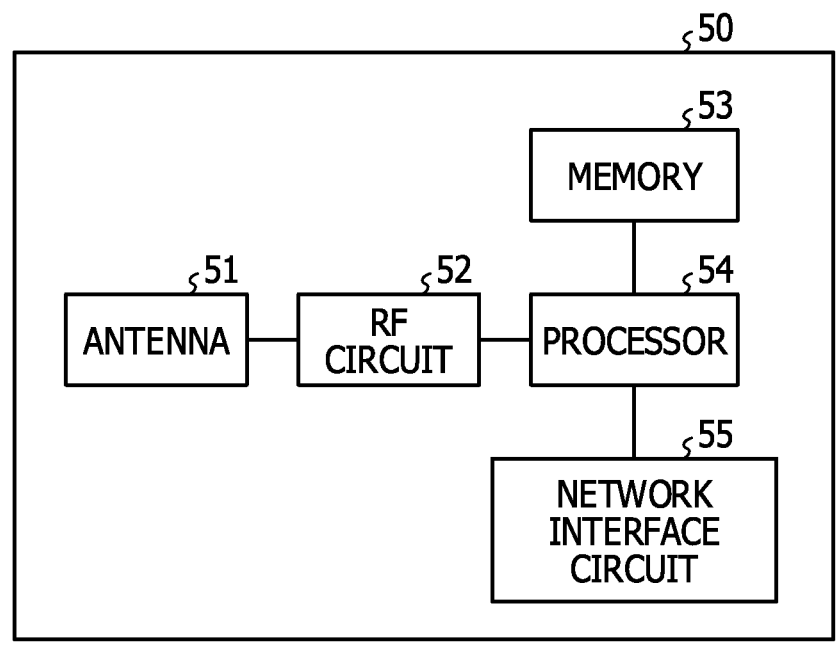
FIG. 14 is a diagram illustrating an example of first wireless communication apparatuses that are described in the first to third embodiments and of a communication apparatus that realizes a function of an eNB.

FIG. 14 is a diagram illustrating an example of the first wireless communication apparatuses that are described in the first to third embodiments or of a communication apparatus 50 that realizes a function of the eNB 20. For example, the communication apparatus 50, as illustrated in FIG. 14, has an antenna 51, an RF circuit 52, a memory 53, a processor 54, and a network interface circuit 55.

The RF circuit 52 performs predetermined processing, such as modulation, on a signal that is output from the processor 54, and transmits the post-processing signal through the antenna 51. Furthermore, the RF circuit 52 performs the predetermined processing, such as the modulation, on the signal that is received through the antenna 51, and outputs the resulting signal to the processor 54. The processor 54, for example, realizes functions of the control unit 2 of the first wireless communication apparatus 1 and the control unit 21 of the eNB 20. The network interface circuit 55 is an interface for connecting to the core network 12 using a wired connection, or one other communication apparatus 50.

The RF circuit 52, the memory 53, and the processor 54, for example, realize the communication unit 3 of the first wireless communication apparatus 1 and the communication unit 22 of the eNB 20. For example, various programs or the like for realizing the function of the communication unit 3 or the communication unit 22 are stored in the memory 53. Then, the processor 54 performs a program that is read from the memory 53, and realizes the function of the communication unit 3 or the communication unit 22 in cooperation with the RF circuit 52 or the like.

Figure 15:
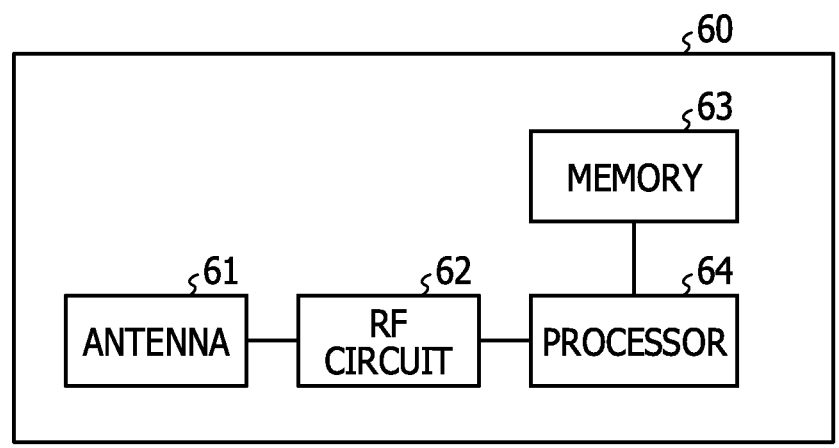
FIG. 15 is a diagram illustrating an example of a communication apparatus that realizes a function of a second wireless communication apparatus or UE that is described in the first to third embodiments.

FIG. 15 is a diagram illustrating an example of a communication apparatus 60 that realizes a function of the second wireless communication apparatus 4 or the UE 30 that is described in the first to third embodiments. For example, the communication apparatus 60, as illustrated in FIG. 15, has an antenna 61, an RF circuit 62, a memory 63, and a processor 64.

The RF circuit 62 performs predetermined processing, such as modulation, on a signal that is output from the processor 64, and transmits the post-processing signal through the antenna 61. Furthermore, the RF circuit 62 performs the predetermined processing, such as the modulation, on the signal that is received through the antenna 61, and outputs the resulting signal to the processor 64. The processor 64, for example, realizes functions of the control unit 5 of the second wireless communication apparatus 4 and the control unit 31 of the UE 30.

The RF circuit 62, the memory 63, and the processor 64, for example, realize functions of the communication unit 6 of the second wireless communication apparatus 4 and the communication unit 32 of the UE 30. For example, various programs or the like for realizing the function of the communication unit 6 or the communication unit 32 are stored in the memory 63. Then, the processor 64 performs a program that is read from the memory 63, and realizes the function of the communication unit 6 or the communication unit 32 in cooperation with the RF circuit 62 or the like.

Others

It is noted that the disclosed technology is not limited to each of the embodiments described above, and that many modifications thereto are possible within the scope that does not depart from the gist thereof.

For example, in the third embodiment described above, in a case where the quality of the communication channel 15 is degraded to a degree that is lower than a predetermined quality, the UE 30 transmits the switching instruction to one other piece of UE 30 in communication via the communication channel 15, but the disclosed technology is not limited to this. For example, in the case where the quality of the communication channel 15 is degraded to a degree that is lower than the predetermined quality, the UE 30 may stop the transmission of the synchronization frame 40 that is periodically transmitted via the communication channel 15. Accordingly, the one other piece of UE 30 in communication via the communication channel 15 can detect the degradation in the quality of the communication channel 15 due to a failure in the reception of the synchronization frame 40, and can voluntarily establish the communication channel 14 between the one other piece of UE 30 itself and the eNB 20. Accordingly, the UE 30 can cause the switching to occur from the communication via the communication channel 15 to the communication via the communication channel 14 that is established between the UE 30 itself and the eNB 20.

Furthermore, in the second and third embodiments described above, for example, RRC connection re-establishment that is an RRC signal is used for the first communication channel establishment request that is transmitted from the UE 30-2 in the connection mode to the eNB 20. It is noted that, even in the case of the existing cellular system, the RRC connection reestablishment is used. For this reason, in a case where the RRC connection re-establishment is used for the first communication channel establishment request, information which distinguishes between an RLF in the communication channel 14 between the eNB 20 and the UE 30, and an RLF in the communication channel 15 between the pieces of UE 30 themselves may be added to the RRC connection re-establishment. The RLF is an acronym for radio link failure. The information that is added to the RRC connection re-establishment, for example, may be a one-bit flag. Furthermore, in order to provide a distinction from an existing RRC connection re-establishment, a new message such as the RRC D2D connection re-establishment may be used for the first communication channel establishment request.

Furthermore, in the second and third embodiments described above, for example, a NAS service request that is a non-access stratum (NAS) control signal is used for the second communication channel establishment request that is transmitted from the UE 30-1 in the idle mode to the eNB 20. Furthermore, for example, an RRC connection reconfiguration that does not include MobilityControlInfo, which is the RRC signal, may be used for the switching instruction that is transmitted in the third embodiment described above.

It is noted that any other signal that is used at Layer 2 or Layer 3 of the OSI reference model may be used as the first communication channel establishment request, the second communication channel establishment request, or the switching instruction. Furthermore, the first communication channel establishment request, the second communication channel establishment instruction, and the switching instruction may be transmitted using a channel that is newly defined for a physical layer.

Furthermore, in the second and third embodiments described above, in a case where the UE 30 detects the degradation in the quality of the communication channel 15, the UE 30 voluntarily establishes the communication channel 14 between the UE 30 itself and the eNB 20 voluntarily, or according to the switching instruction that is transmitted from one other piece of UE 30. Then, the UE 30 causes the switching to occur from the communication via the communication channel 15 to the communication via the communication channel 14. However, the disclosed technology is not limited to this. For example, as another example, in the case where the quality of the communication channel 15 is poorer than the predetermined quality, the UE 30-2 in the connection mode may transmit a result of measurement of the quality of the communication channel 15 to the eNB 20. In the case where the quality of the communication channel 15 is degraded to a degree that is lower than the predetermined quality, the eNB 20 may instruct the UE 30 that the communication channel 14 is established between the eNB 20 itself and the UE 30 and that switching is caused to occur from the transmission between the pieces of UE 30 themselves via the communication channel 15 to the communication channel 14 that is established between the UE 30 itself and the eNB 20. According to an instruction from the eNB 20, the UE 30 switches between communication channels and thus can realize the suppression of the occurrence of the disconnection of the communication between the pieces of UE 30 themselves with high reliability.

It is noted that, in the examples described above, the eNB 20 transmits the first communication channel establishment instruction to the UE 30-2 in the connection mode, and thus establishes the communication channel 14-2 between the eNB 20 itself and the UE 30-2. For example, an RRC connection reconfiguration that is the RRC signal may be used for a first communication channel establishment instruction. Furthermore, the eNB 20 transmits a second communication channel establishment instruction to the UE 30-1 in the idle mode, and thus establishes the communication channel 14-1 between the eNB 20 itself and the UE 30-1. For example, a paging signal may be used for the second communication channel establishment instruction. Furthermore, the result of the measurement that is transmitted from the UE 30-2 to the eNB 20 may be transmitted, for example, using a measurement report that is the RRC signal.

It is noted that any other signal that is used at Layer 2 or Layer 3 of the OSI reference model may be used for transmission of the first communication channel establishment instruction, the second communication channel establishment instruction, or the result of the measurement. Furthermore, the first communication channel establishment instruction, the second communication channel establishment instruction, and the result of the measurement may be transmitted using a channel that is newly defined for a physical layer.

Furthermore, the second and third embodiments described above, a value of timer that is used by the UE 30 may be set in advance for the UE 30, and the eNB 20 may provide the UE 30 with an instruction as to the value of the timer.

All examples and conditional language recited herein of the RFID tag and the high frequency circuit are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus that is used as a second wireless communication apparatus in a wireless communication system that includes a first wireless communication apparatus and a plurality of the second wireless communication apparatuses, the wireless communication apparatus comprising:
  a communication circuit configured to perform at least any one of wireless communication via a first communication channel that is a Device-to Device (D2D) communication channel directly between the wireless communication apparatus and one other second wireless communication apparatus, and wireless communication via a second communication channel between the wireless communication apparatus and the first wireless communication apparatus, the second communication channel being a cellular communication channel connected to a network of the wireless communication system via the first communication apparatus, wherein the wireless communication apparatus maintains an idle mode with the second communication channel when not in a connected mode via the second communication channel during a period of wireless communication via the first communication channel; and
  a control circuit configured to perform first processing when a line disconnection is detected after a first state continues for a predetermined time, the first state being a state where a quality of the first communication channel is poorer than a prescribed quality in a case where the wireless communication apparatus operates in the idle mode via the second communication channel during the period the wireless communication apparatus performs communication with the one other second wireless communication apparatus via the first communication channel, the first processing including establishing the second communication channel with the first wireless communication apparatus.

2. The wireless communication apparatus according to claim 1,
  wherein the communication circuit is configured to perform wireless communication via the second communication channel established by the first processing of the control circuit.

3. The wireless communication apparatus according to claim 2,
  wherein the control circuit is configured to perform the first processing at a first timing after paging information is received from the first wireless communication apparatus, the first timing being the earliest of a timing at which the time for which the state where the quality of the first communication channel is poorer than the prescribed quality continues reaches a prescribed time and a timing at which paging information is received.

4. The wireless communication apparatus according to claim 1,
  wherein the control circuit is configured to perform the first processing when a switching instruction that is transmitted via the first communication channel is received from the one other second wireless communication apparatus, in the case where the wireless communication apparatus operates in the idle mode and where the communication between the wireless communication apparatus and the one other second wireless communication apparatus is performed via the first communication channel.

5. The wireless communication apparatus according to claim 4,
  wherein the control circuit is configured to perform the first processing when a state where the quality of the first communication channel is poorer than the prescribed quality continues for a prescribed time or longer, even in a case where the switching instruction is not received from the one other second wireless communication apparatus.

6. The wireless communication apparatus according to claim 1,
  wherein the first wireless communication apparatus is a base station, and
  wherein the second wireless communication apparatus is a terminal or a mobile station.

7. A wireless communication apparatus that is used as a first wireless communication apparatus in a wireless communication system that includes the first wireless communication apparatus, a second wireless communication apparatus that operates in an idle mode, and a third wireless communication apparatus that operates in the idle mode or a connection mode, the wireless communication apparatus comprising:
  a communication circuit configured to perform, via a second communication channel, wireless communication with the second wireless communication apparatus and the third wireless communication apparatus which perform communication directly with each other via a first communication channel that is a Device-to Device (D2D) communication channel, the second communication channel being a cellular communication channel connected to a network of the wireless communication system via the first communication apparatus, wherein the second wireless communication apparatus maintains an idle mode via the second communication channel when not in a connected mode via the second communication channel during a period of wireless communication with the third wireless communication apparatus via the first communication channel; and
  a control circuit configured to perform first processing when a line disconnection is detected after a first state continues for a predetermined time, the first state being a state where a quality of the first communication channel is poorer than a prescribed quality in a case where the second wireless communication apparatus operates in the idle mode via the second communication channel during the period the second wireless communication apparatus performs communication with the third wireless communication apparatus via the first communication channel, the first processing including establishing the second communication channel with the first wireless communication apparatus.

8. The wireless communication apparatus according to claim 7,
  wherein the first wireless communication apparatus is a base station, and
  wherein the second wireless communication apparatus and the third wireless communication apparatus are terminals or mobile stations.

9. A wireless communication system comprising:
  a first wireless communication apparatus;
  a second wireless communication apparatus that operates in an idle mode; and
  a third wireless communication apparatus that operates in the idle mode or a connection mode,
  wherein the second wireless communication apparatus includes a first communication circuit configured to perform wireless communication via a first communication channel that is a Device-to Device (D2D) communication channel directly between the second wireless communication apparatus and the third wireless communication apparatus, and wireless communication via a second communication channel between the second wireless communication apparatus and the first wireless communication apparatus, the second communication channel being a cellular communication channel connected to a network of the wireless communication system via the first communication apparatus, wherein the second wireless communication apparatus maintains an idle mode via the second communication channel when not in a connected mode via the second communication channel during a period of wireless communication with the third wireless communication apparatus via the first communication channel, and a first control circuit configured to perform first processing when a line disconnection is detected after a first state continues for a predetermined time, the first state being a state where a quality of the first communication channel is poorer than a prescribed quality in a case where the wireless communication apparatus operates in the idle mode via the second communication channel during the period the wireless communication apparatus performs communication with the third wireless communication apparatus via the first communication channel, the first processing including establishing the second communication channel with the first wireless communication apparatus, wherein the third wireless communication apparatus includes:

a second communication circuit configured to perform, via a second communication channel, wireless communication via the first communication channel between the third communication apparatus and the second wireless communication apparatus, and wireless communication via the second communication channel between the third communication apparatus and the first wireless communication apparatus, and wherein the first wireless communication apparatus includes:

a third communication circuit configured to perform wireless communication with the second wireless communication apparatus and the third wireless communication apparatus via a second communication channel, and a third control circuit configured to perform second processing when a line disconnection is detected after a second state continues for a predetermined time, the second state being a state where a quality of the first communication channel is poorer than a prescribed quality in a case where the second wireless communication apparatus communicates with the third wireless communication apparatus via the first communication channel, the second processing including establishing the second communication channel with the second wireless communication apparatus.

10. The wireless communication system according to claim 9, wherein the first wireless communication apparatus is a base station, and wherein the second wireless communication apparatus and the third wireless communication apparatus are terminals or mobile stations.

11. A processing method implemented by a second wireless communication apparatus, the second wireless communication apparatus being one of a plurality of second wireless communication apparatuses included in a wireless communication system, the wireless communication system including a first wireless communication apparatus and the plurality of second communication apparatuses, the processing method comprising:

establishing a first communication channel that is a Device-to Device (D2D) communication channel directly with another one of the plurality of second wireless communication apparatuses, wherein the second wireless communication apparatus maintains an idle mode via a second communication channel when not in a connected mode via the second communication channel during a period of wireless communication via the first communication channel, the second communication channel being a cellular communication channel connected to a network of the wireless communication system via the first communication apparatus;

performing first processing when a line disconnection is detected after a first state continues for a predetermined time, the first state being a state where a quality of the first communication channel is poorer than a predetermined quality in a case where the second wireless communication apparatus operates in the idle mode via the second communication channel during the period the second wireless communication apparatus performs communication with the other one of the plurality of second wireless communication apparatuses via the first communication channel, the first processing including establishing the second communication channel with the first wireless communication apparatus.

12. The processing method according to claim 11, wherein the first wireless communication apparatus is a base station, and wherein the second wireless communication apparatus is a terminal or a mobile station.

13. A processing method implemented by a first wireless communication apparatus included in a wireless communication system, the wireless communication system including the first wireless communication apparatus a second wireless communication apparatus, and a third wireless communication apparatus, the processing method comprising:

establishing a second communication channel with the third wireless communication apparatus, the third wireless communication apparatus being configured to communicate with the second wireless communication apparatus via a first communication channel that is a Device-to Device (D2D) communication channel established directly between the third wireless communication apparatus and the second wireless communication apparatus, the second communication channel being a cellular communication channel connected to a network of the wireless communication system via the first communication apparatus, wherein the second wireless communication apparatus maintains an idle mode via the second communication channel when not in a connected mode via the second communication channel during a period of wireless communication with the third wireless communication apparatus via the first communication channel; and receiving, from the third wireless communication apparatus, data destined for the second wireless communication apparatus via the second communication channel, performing first processing when a line disconnection is detected after a first state continues for a predetermined time, the first state being a state where a quality of the first communication channel is poorer than a predetermined quality in a case where the second wireless communication apparatus operates in the idle mode via the second communication channel during the period the second wireless communication apparatus communicates with the third wireless communication apparatus via the first communication channel, the first processing including establishing the second communication channel with the second wireless communication apparatus.

14. The processing method according to claim 13, wherein the first wireless communication apparatus is a base station, and wherein the second wireless communication apparatus and the third wireless communication apparatus are terminals or mobile stations.

\* \* \* \* \*